United States Patent
Tax et al.

(10) Patent No.: US 11,669,820 B2
(45) Date of Patent: Jun. 6, 2023

(54) INITIATING SPLIT DATA TRANSFERS AT A TERMINAL

(71) Applicant: The Toronto-Dominion Bank, Toronto (CA)

(72) Inventors: David Samuel Tax, Toronto (CA); Milos Dunjic, Oakville (CA); Derek Richard Castell, Hamilton (CA); Anthony Haituyen Nguyen, Toronto (CA); Bryan Michael Gleeson, Bowmanville (CA); Jeffrey Aaron Ecker, North York (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/144,599

(22) Filed: Jan. 8, 2021

(65) Prior Publication Data

US 2022/0222642 A1    Jul. 14, 2022

(51) Int. Cl.
    *G06Q 20/20*        (2012.01)
    *G06Q 20/32*        (2012.01)
    *G06Q 20/40*        (2012.01)

(52) U.S. Cl.
    CPC ......... *G06Q 20/204* (2013.01); *G06Q 20/325* (2013.01); *G06Q 20/3276* (2013.01); *G06Q 20/405* (2013.01)

(58) Field of Classification Search
    CPC .............. G06Q 20/204; G06Q 20/325; G06Q 20/3276; G06Q 20/405
    See application file for complete search history.

(56) References Cited

U.S. PATENT DOCUMENTS

| | | | |
|---|---|---|---|
| 9,721,243 B2 * | 8/2017 | Itwaru | G06Q 20/20 |
| 10,621,563 B1 | 4/2020 | Spindel et al. | |
| 11,068,867 B1 * | 7/2021 | Tucker | G06Q 30/04 |
| 2014/0156517 A1 * | 6/2014 | Argue | G07G 1/0081 705/40 |
| 2017/0124540 A1 * | 5/2017 | Chan | G06Q 20/204 |
| 2017/0364914 A1 * | 12/2017 | Howard | G06Q 20/385 |

* cited by examiner

*Primary Examiner* — A. Hunter Wilder
*Assistant Examiner* — Joseph M Mutschler
(74) *Attorney, Agent, or Firm* — Rowand LLP

(57) ABSTRACT

A method may include: causing a point-of-sale terminal processing a transaction to display a machine-readable code, the machine-readable code encoding a web address; receiving a request from a device that scanned the machine-readable code, the request received at the web address; in response to receiving the request, causing the device that scanned the machine-readable code to output an interface; receiving, through the interface, an input of an indication to separate the transaction into multiple transaction parts and one or more parameters indicating how the transaction is to be separated; and sending, to the point-of-sale terminal, a message that configures the point-of-sale terminal to separate the transaction in accordance with the one or more parameters.

20 Claims, 11 Drawing Sheets

INITIATING SPLIT DATA TRANSFERS AT A TERMINAL

TECHNICAL FIELD

The present application relates to terminal devices and, more particularly, to systems and methods for splitting a data transfer at a terminal into multiple data transfer parts.

BACKGROUND

Operator terminals may sometimes be used to process a data transfer between accounts. For various reasons, an operator of such a terminal may wish to configure the data terminal to transfer data from more than one account. By way of example, an operator of a point of sale (POS) terminal may wish to initiate a transfer from accounts associated with multiple entities.

DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
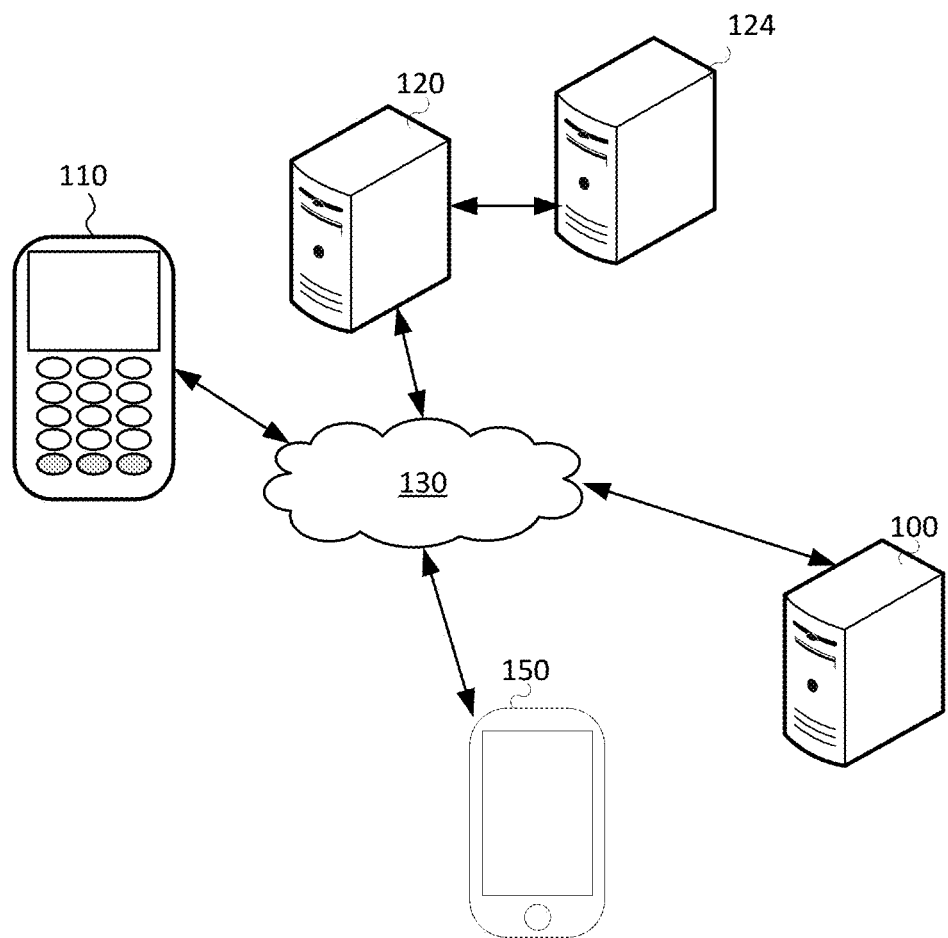
FIG. 1 is a schematic diagram illustrating an operating environment of an example embodiment.

In an aspect, a processor-implemented method is disclosed. The method may be performed by a server. The method may include: causing a point-of-sale terminal processing a transaction to display a machine-readable code, the machine-readable code encoding a web address; receiving a request from a device that scanned the machine-readable code, the request received at the web address; in response to receiving the request, causing the device that scanned the machine-readable code to output an interface; receiving, through the interface, an input of an indication to separate the transaction into multiple transaction parts and one or more parameters indicating how the transaction is to be separated; and sending, to the point-of-sale terminal, a message that configures the point-of-sale terminal to separate the transaction in accordance with the one or more parameters.

Conveniently, in this way, a transfer/transaction may be split into multiple parts at a point-of-sale terminal but the splitting may be configured on a customer device. This may allow a customer to configure a split transaction without having to contact the point-of-sale terminal. Rather, the customer may use their own customer device to configure the split.

In some implementations, the machine-readable code may encode a base amount of a transaction. The request from the device may reference the base amount of the transaction. The interface may indicate the base amount of the transaction.

In some implementations, the machine-readable code may encode a transaction identifier. The request from the device may reference the transaction identifier. The message may be sent to the point-of-sale terminal based on the transaction identifier.

In some implementations, the one or more parameters may include an image captured at the device that scanned the machine-readable code. The image may purport to be of a plurality of individuals. Each individual may be associated with a respective transaction part of the multiple transaction parts. The method may further include determining a number of the plurality of individuals from the image and the message may indicate the number of the plurality of individuals.

In some implementations, the one or more parameters may include a plurality of identifiers. Each identifier may be associated with a respective one of the transaction parts. The message may configure the point-of-sale terminal to output iterative prompts for input of a token associated with respective transaction part using the plurality of identifiers.

In some implementations, the plurality of identifiers may include a plurality of names.

In some implementations, the one or more parameters may further include an indicator defining a respective size of each of the multiple transaction parts. The iterative prompts may each indicate a size of an associated one of the multiple transaction parts as determined from the indicator defining the respective size.

In some implementations, the indicator defining the respective size may indicate that the transaction parts are to be equal parts.

In some implementations, the indicator defining the respective size may associate each item that is related to the transaction with a respective one of the transaction parts.

In some implementations, the indicator defining the respective size may associate each item that is related to the transaction with a respective one of the transaction parts using an associated name.

In some implementations, the iterative prompts may prompt for completion of the transaction part using a respective physical token.

In yet another aspect, a server is disclosed. The server may include a communications module. The server may include a processor coupled with the communications module. The server may include a memory coupled to the processor and storing processor-executable instructions which, when executed by the processor, configure the server to perform a method described herein.

In another aspect, a computer-readable storage medium may be provided. The computer-readable storage medium may include processor-executable instructions which, when executed, configure a processor to perform a method described herein.

In yet another aspect, a method performed by a point-of-sale terminal is disclosed. The method may include: obtaining a machine-readable code, the machine-readable code encoding a web address; displaying the machine-readable code; receiving, from a server associated with the web address, a message that includes transaction apportionment data; and processing a plurality of transaction parts based on the transaction apportionment data.

In some implementations, processing the plurality of transaction parts based on the transaction apportionment data may include iteratively processing the transaction parts until all transaction parts have been processed.

In some implementations, the transaction apportionment data may include a plurality of identifiers. Each identifier may be associated with a respective one of the transaction parts. Processing the plurality of transaction parts may include outputting iterative prompts for input of a token associated with respective transaction part using the plurality of identifiers.

In some implementations, the plurality of identifiers may include a plurality of names.

In some implementations, the transaction apportionment data may further include an indicator defining a respective size of each of the transaction parts. The iterative prompts may each indicate a size of an associated one of the plurality of transaction parts as determined from the indicator defining the respective size.

In some implementations, the indicator defining the respective size may indicate that the transaction parts are to be equal parts.

In some implementations, the indicator defining the respective size may associate each item that is related to the transaction with a respective one of the transaction parts.

In some implementations, the indicator defining the respective size may associate each item that is related to the transaction with a respective one of the transaction parts using an associated name.

In some implementations, the iterative prompts may prompt for completion of the transaction part using a respective physical token.

In yet another aspect, a point-of-sale terminal is described. The point-of-sale terminal may include a physical token reader. The point-of-sale terminal may include a physical token reader, a communications module, a display module, an input module, a processor coupled with the communications module, the input module, the display module and the physical token reader. The point-of-sale terminal may include a memory coupled to the processor and storing processor-executable instructions which, when executed by the processor, configure the point-of-sale terminal to perform a method described herein.

In yet another aspect, a method is described. The method may include: obtaining apportionment data for a transfer, the apportionment data defining a plurality of parts of the transfer; and processing the transfer in accordance with the apportionment data, by: processing a pre-authorization for a total amount of the transfer using a first token; after processing the pre-authorization for the total amount of the transfer using the first token, processing one or more of the parts using associated tokens; and completing the transfer by processing a completion of the pre-authorization for an outstanding portion of the transfer, the outstanding portion of the transfer determined by adjusting the total amount of the transfer to account for any processed parts.

Conveniently, in this way, a split transfer may be performed in a manner in which completion of the transfer remains possible even if there is an error, such as a data transmission error which prevents completion of all parts.

In some implementations, processing at least one of the parts may include iteratively processing all parts other than a particular one of the parts. The particular one of the parts may be a part that is to be associated with the first token.

In some implementations, the method may further include: obtaining a machine-readable code, the machine-readable code encoding a web address; and displaying the machine-readable code. Obtaining the apportionment data for the transfer may include receiving, from a server associated with the web address, a message that includes the apportionment data.

In some implementations, the method may include detecting a processing failure and triggering the completing of the transfer in response to detecting the processing failure.

In some implementations, detecting the processing failure may include detecting a timeout during an attempted processing of at least one of the parts.

In some implementations, the method may further include: prior to completing the transfer, comparing the outstanding portion of the transfer to an amount of a first one of the parts, the first one of the parts being associated with a first entity, the first entity associated with the first token; and outputting a message, the message indicating that the transfer will be completed at an amount that exceeds the amount of the first one of the parts.

In some implementations, processing one or more of the parts using associated tokens may include, for each of the one or more parts being processed, outputting a prompt based on the apportionment data. The prompt may identity an amount of the part being processed and an identifier of an entity associated with that part.

In some implementations, processing the one or more of the parts using associated tokens may include, for each of the one or more parts being processed: obtaining a representation of the associated token for that part; and sending a message to a transfer rail based on the associated token for that part, the message intended to effect a transfer in an amount associated with that part.

In some implementations, the apportionment data includes a plurality of identifiers. Each identifier may be associated with a respective one of the parts. Processing a pre-authorization for a total amount of the transfer using a first token may include outputting a prompt for input of a token associated with a first one of the parts. Processing one or more of the parts using associated tokens may include outputting iterative prompts for input of a token associated with respective part using the plurality of identifiers.

In yet another aspect, a computing device is disclosed. The computing device may include a communications module. The computing device may include a processor coupled with the communications module. The computing device may include a memory coupled to the processor and storing processor-executable instructions which, when executed by the processor, configure the computing device to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Sometimes it may be necessary or desirable to split a transfer at a terminal into multiple parts. By way of example, it may be that an operator of a point-of-sale (POS) terminal would like to split a transaction into multiple transaction parts. For example, a bill may be divided into multiple parts to allow a customer to use more than one payment method to satisfy the bill. For example, the bill may be for an amount that exceeds the resources available for transfer using one transfer method (e.g., a particular payment card) and so the bill may be split into multiple parts so that more than one payment method may be used. For example, a customer may owe $2000 but may only have a $1500 limit available on a particular payment card and so that customer may wish to use a second payment card to satisfy any deficiency in the balance following use of the particular payment card.

Split transactions may also be desirable when multiple parties wish to split a bill. By way of example, it may be that a plurality of customers attend a restaurant and wish to divide a total bill among two or more of the plurality of customers.

Conventional terminals, such as POS terminals, often require an operator associated with a merchant to determine how a bill is to be divided offline (e.g., using a calculator) and then to process separate transactions for each part of the split by manually inputting the amount of each split into the POS terminal. Such conventional systems have many drawbacks. For example, the manual input of the amount for each transaction part may be time consuming and prone to error. Further, since the operator associated with the merchant typically calculates the amount of each transaction part, the operator will typically only perform a simple operation, such as dividing the total bill by the number of transaction parts.

At least some implementations described herein may address one or more of the problems associated with such conventional systems. Additionally, or alternatively, at least some implementations described herein may allow a customer to configure a split transfer on their own device rather than on the POS terminal. Offloading at least some of the configuration of a split transaction to a customer device may have multiple benefits including, for example, minimizing (or eliminating) customer contact with the terminal and/or minimizing the amount of time that the terminal is used by the customer or for a particular transaction. Minimizing customer contact with the terminal may be useful to, for example, avoid the spread of germs and viruses. Minimizing the amount of time that the terminal is in use for a particular transaction may allow the terminal to be used for a greater number of transactions.

Additionally, or alternatively, at least some implementations described herein may perform a split transaction using techniques that allow a transaction to be completed even when a processing failure occurs. For example, it may be that a terminal is located at a location with poor communications network connectivity and that connectivity may be lost after some of the split transaction parts have been processed but others have not yet been processed. At least some techniques described herein may allow for completion of a split transaction in such scenarios.

FIG. 1 is a schematic operation diagram illustrating an operating environment of an example embodiment.

As illustrated in FIG. 1, a POS terminal 110 may communicate with a remote interface server 100. Such communication may be by way of the network 130. The remote interface server 100 may also communicate with a customer device 150 and such communication may be by way of a network, such as the network 130.

The customer device 150 is a computing device that is associated with a customer. By way of example, the customer device 150 may include any one or more of: a mobile device, a tablet computer, a laptop computer, a wearable computer, or a computing device of another type.

As will be described in greater detail below, the remote interface server 100 may interact with the customer device 150 to allow a customer to provide input at the customer device 150 so that at least some input need not be provided at the POS terminal 110 directly. Accordingly, the remote interface server 100 may be or may be associated with a web server.

The remote interface server 100 may also communicate the input received from the customer device 150 to the POS terminal 110 to allow the POS terminal 110 to process a transaction that is based on the received input. Such communication may, for example, be by way of a network, such as the network 130.

As illustrated, a point-of-sale (POS) terminal 110 may communicate with a transfer rail 120 which relays transaction data to an appropriate issuer system 124. Such communication may be via a network, such as the network 130. The transfer rail 120 may also be referred to as a payment rail.

The point-of-sale terminal is associated with an acquirer and the communication between the POS terminal 110 and the transfer rail 120 may be by way of a back-end acquirer system. The POS terminal 110 may be located at a location that is associated with a merchant. By way of example, the merchant may be a store, restaurant, gym, etc. The acquirer is a merchant bank that accepts deposits associated with transactions made at the point-of-sale terminal and facilitates settlement and deposit of those deposits into an account associated with the merchant.

While a single transfer rail 120 is illustrated in FIG. 1, in practice the POS terminal 110 may communicate with multiple transfer rails. By way of example, the transfer rail 120 may include any one or a combination of Amex™, Visa™ and/or Mastercard™. Other transfer rails may also be used. The POS terminal and/or a back-end acquirer system in communication with the POS terminal may, after obtaining data from a physical token, such as a value transfer card or a mobile device having a representation of a payment card which has engaged a physical token reader provided at the POS terminal, determine which of the transfer rails is to be used. For example, the POS terminal/acquirer system may determine that the physical token is associated with Visa™ and may, in response, select the Visa™ payment rail or it may, instead, determine that the physical token is associated with Mastercard™ and select the Mastercard™ payment rail.

After a transfer rail is identified, the POS terminal/acquirer system sends the transfer rail a message. The message may be sent through a network, such as the network 130. The message includes a value amount representing an amount of value that is to be transferred to complete a transaction and physical token data such as a primary account number (PAN) associated with a physical token. The transfer rail identifies an associated issuer based on the physical token data and communicates with the identified issuer to process the transaction. More particularly, the transfer rail 120 routes the message received from the POS terminal to an issuer system 124 for the identified issuer. The issuer system then determines whether the transaction is approved or denied based on pre-defined rules. The rules may, for example, consider any one or more of: whether the cardholder has available funds, whether the merchant is of a type that is permitted, whether the transaction violates any spending limits, etc.

When the issuer system determines whether to approve or deny the transaction, it sends a message indicating the result of this determination to the POS terminal 110 via the transfer rail 120. The result may then be displayed or otherwise output at the POS terminal 110.

The issuer system 124, point-of-sale terminal 110, customer device 150, remote interface server 100, and the transfer rail 120 may be in geographically disparate locations. Put differently, each of issuer system 124, point-of-sale terminal 110, customer device 150, remote interface server 100, and the transfer rail 120 may be remote from others of the issuer system 124, point-of-sale terminal 110, customer device 150, remote interface server 100, and the transfer rail 120.

The issuer system 124, point-of-sale terminal 110, customer device 150, remote interface server 100, and the transfer rail 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
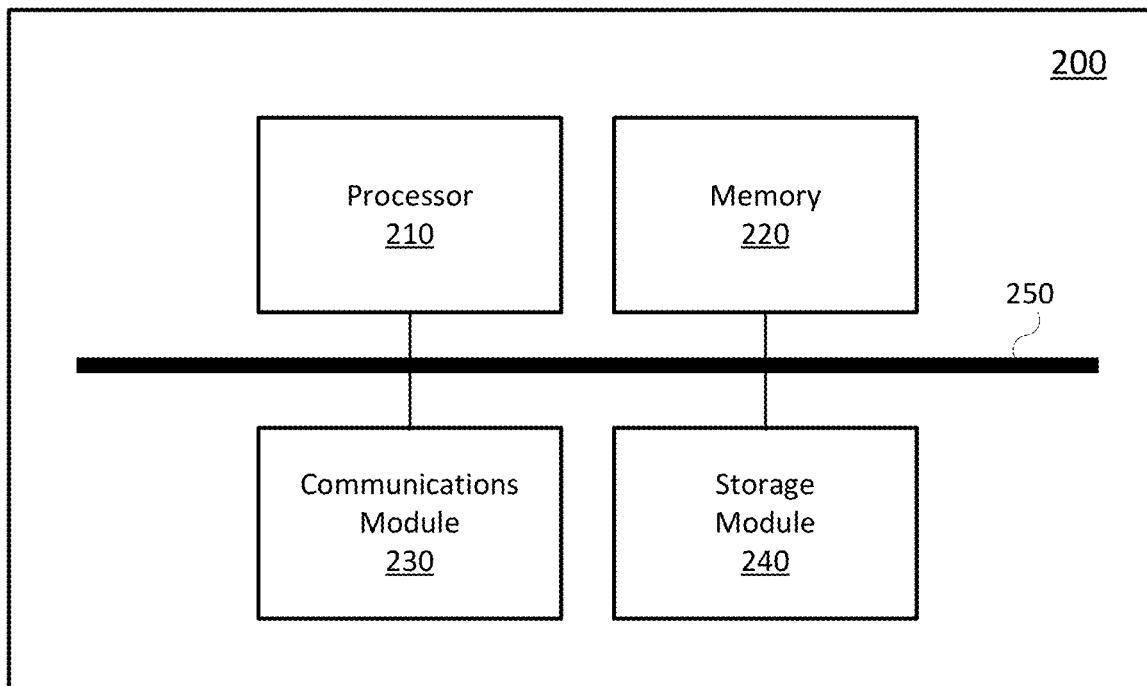
FIG. 2 is high-level schematic diagram of a computing device.

Referring now to FIG. 2, a high-level operation diagram of an example computing device 200 will now be described. The example computing device 200 may be exemplary of the issuer system 124, point-of-sale terminal 110, customer device 150, remote interface server 100, and/or transfer rail 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer system 124, point-of-sale terminal 110, customer device 150, remote interface server 100, and/or the transfer rail 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Where the computing device 200 is operating as the POS terminal 110, the computing device 200 may include a physical token reader. The physical token reader is configured for reading a physical token such as a value transfer card or a mobile device having a representation of a value transfer card stored thereon. The physical token reader may be or include a card slot which facilitates communication with the physical token through physical contact and/or a contactless reader such as a near field communication (NFC) reader which may facilitate communication with the physical cal token through communication protocols that do not rely on physical contact with the physical token.

As noted above, the computing device 200 may include one or more input modules and/or one or more output modules. For example, where the computing device 200 is operating as the POS terminal 110 it may include one or more input modules such as a touchscreen display and/or a keypad that may be configured to receive user input. The input modules may be used by an operator, for example. Where the computing device 200 is operating as the POS terminal 110, it may also include a display module which is used for displaying a user interface that facilitates payment processing.

When the computing device 200 is operating as the customer device 150, the input modules may include a camera or scanner than may be used to scan a machine-readable code. As will be explained more fully below, when the machine-readable code is scanned, it may direct the customer device to the remote interface server 100 which may provide a user interface to the customer device 150. The user interface may be configured to receive input of an indication to separate a transaction into multiple transaction parts. The user interface may, additionally, or alternatively, be configured to receive input of one or more parameters indicating how the transaction is to be separated.

Figure 3:
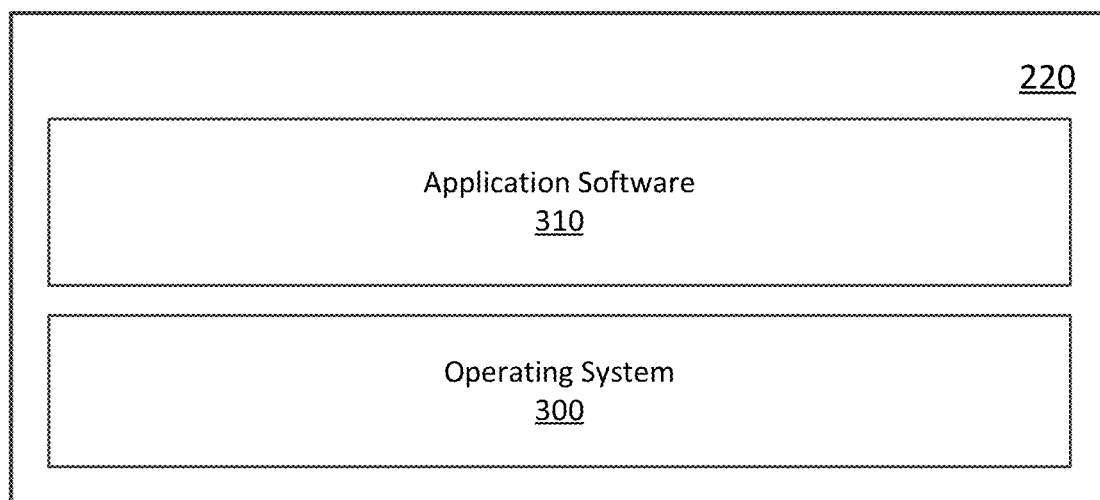
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™ Apple™ iOS™. UNIX™, Linux™ Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer system 124, point-of-sale terminal 110, customer device 150, remote interface server 100, and/or the transfer rail 120.

While a single application software 310 is illustrated in FIG. 3, in operation the memory 220 may include more than one application software 310 and different application software 310 may perform different operations.

Figure 4:
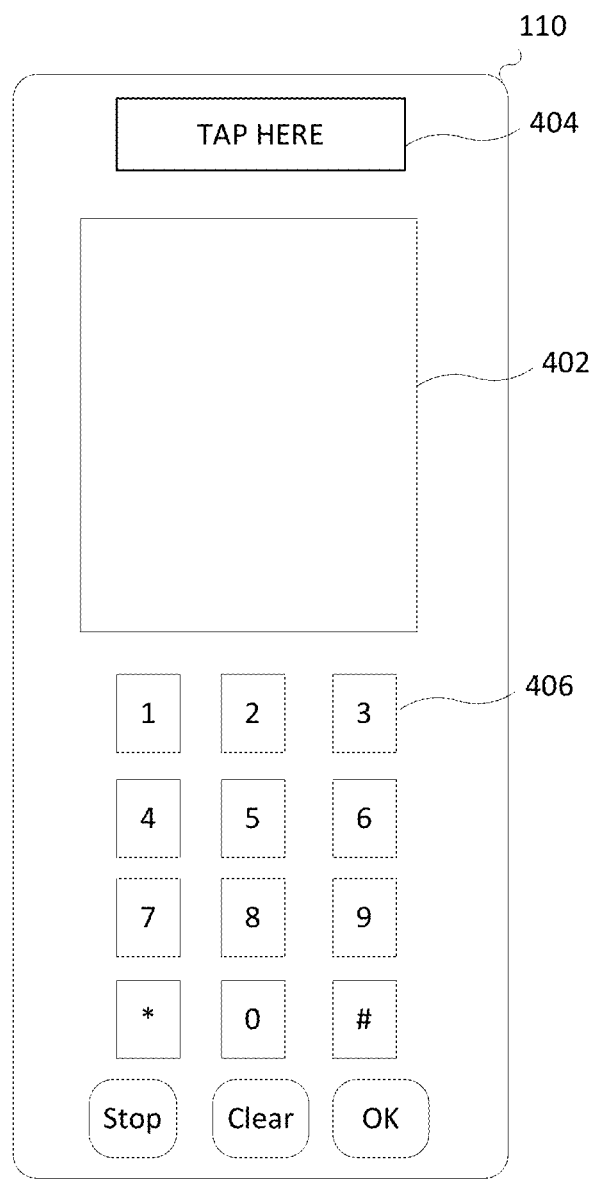
FIG. 4 shows an example point-of-sale terminal.

Referring now to FIG. 4, an example POS terminal 110 is illustrated. The POS terminal includes a physical token reader which, in the example, includes a wireless physical token reader configured for near field communications. The physical token reader may be used by tapping a physical token at a particular region 404 of the POS terminal 110. The particular region 404 is a sensing region. That is, when the physical token is placed at or near the particular region, the POS terminal 110 is able to communicate with the physical token to obtain physical token data.

The POS terminal 110 includes one or more output modules. In the example, the output modules include a display module 402. The display module 402 may, in at least some implementations, be a touchscreen display. In such cases, the display module 402 is both an output module and an input module.

The POS terminal 110 may include an input module of another type instead of or in addition to a touchscreen display. By way of example, the displayed POS terminal 110 includes a keypad 406. The input module may be used by an operator in order to setup a transaction. By way of example, the operator may input an amount of a transaction. The amount of the transaction may be a base amount of the transaction. The base amount of the transaction is an amount of the transaction that excludes any optional amounts, such as tips. In some instances, the POS terminal may include or be associated with a scanner such as a bar-code reader which may be used to scan bar-codes that are displayed on tags associated with merchandise. In such instances, the operator may not input the base amount of the transaction directly; the base amount may be determined by a computer having access to price data.

By way of further example, in some instances, the POS terminal 110 may be associated with a computer system which allows an operator to input order information that may be used to calculate a base amount that is provided directly to the POS terminal 110. For example, the computer system may be a merchant terminal that may allow an operator to select items for an order from a predefined list, such as a list associated with a menu, and the merchant terminal may then calculate a base amount for a transaction and send it to the POS terminal.

The POS terminal 110 may, in some instances, include other physical token readers apart from the wireless physical token reader. For example, a card slot may be included and may be arranged so that when a value transfer card is inserted in the card slot, one or more pins or pads associated with the card may align with pads or pins provided in the POS terminal 110 that are intended for reading data from the card.

By way of further example, in some instances, the physical token readers may include a magnetic reader which is configured for reading data from a magnetic strip associated with a value transfer card.

Figure 5:
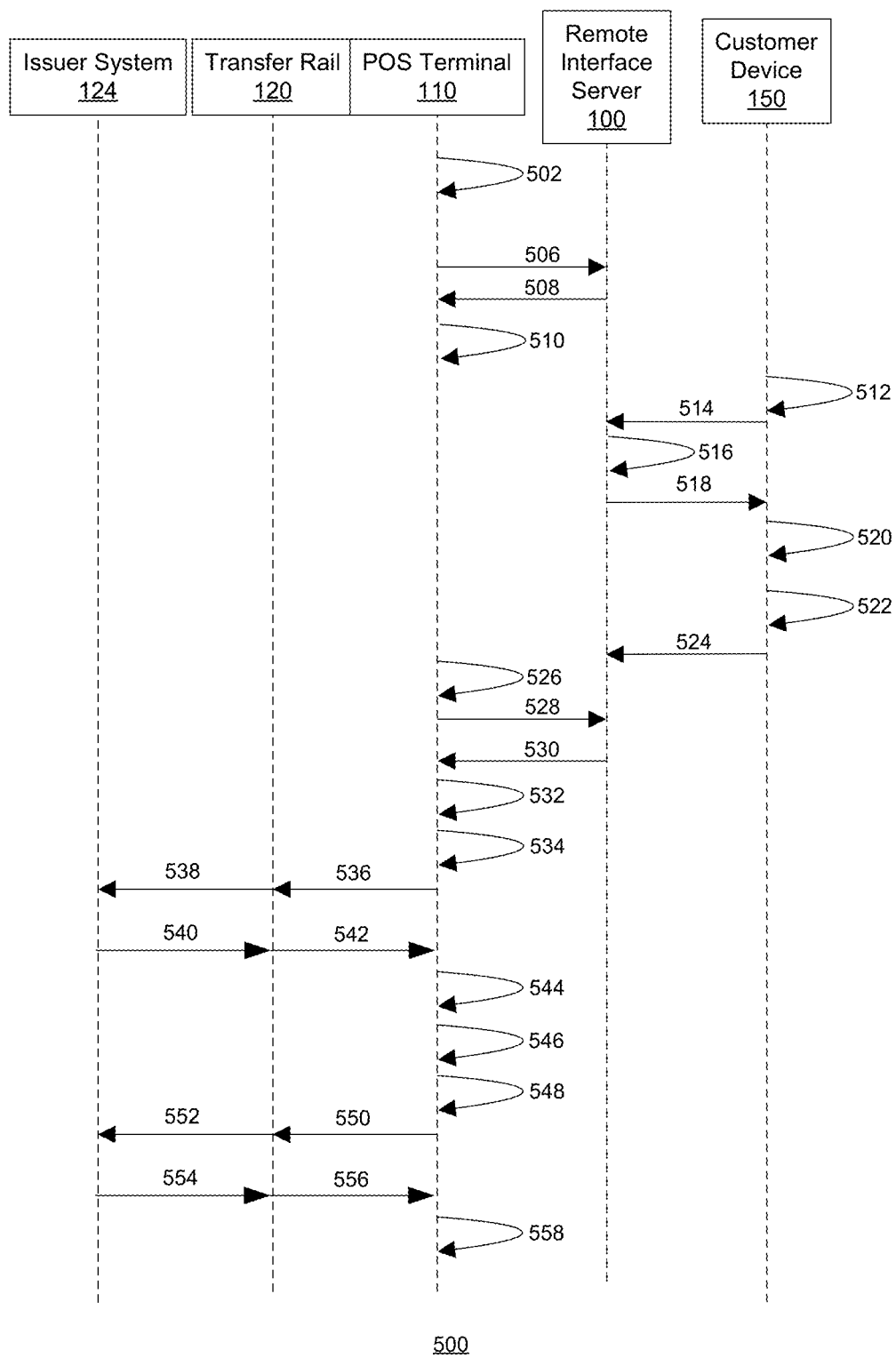
FIG. 5 shows a sequence diagram illustrating messages exchanged between systems illustrated in FIG. 1.

Reference is now made to FIG. 5. FIG. 5 illustrates a sequence diagram 500, similar to a Unified Modelling Language (UML) sequence diagram, that shows how the customer device 150, remote interface server 100, POS terminal 110, transfer rail 120 and the issuer system 124 may communicate in some embodiments, and, in particular, depicting messages exchanged therebetween in processing a transaction. That is, such messages may be used for initiating a data transfer or initiating a transfer of value.

The operations that are performed by the customer device 150, remote interface server 100, POS terminal 110, transfer rail 120 and the issuer system 124 in exchanging the messages illustrated in the sequence diagram and/or in performing various operations referred to herein, may be performed by processors executing processor-executable instructions stored in a memory. The processors may be coupled to a communications module which may be used in sending and/or receiving the various messages.

In the following description of the sequence diagram 500, discussion is made of various messages being sent and received via a computer network such as, for example, network 130. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that various message pairs illustrated in FIG. 5 correspond to an RPC or a web service API call and a reply or callback in response to that call.

As illustrated, at the beginning of sequence, at 502, the POS terminal 110 may receive transaction setup data, such as a base amount of a transaction. The base amount may be received through an input module that is configured for receiving operator input. The input module may be provided on the POS terminal or on an associated system that is communicably coupled with the POS terminal 110. By way of example, in some implementations, the base amount may be received via direct input on a keypad 406 (FIG. 4) provided at the POS terminal. In other instances, another point of sale system may receive input that may be used to determine the base amount (e.g., by scanning a bar code or by selecting an item for purchase from a list of available items) and the base amount may then be sent to the POS terminal 110. A base amount of a transaction may be an amount of a transaction that a customer is required to pay and the base amount of the transaction may exclude an optional amount (also known as a voluntary amount and/or a variable amount), such as an amount for a tip. The base amount may, in at least some implementations, include applicable tax.

In some instances, the transaction setup data that is received at operation 502 may include an indication that a customer would like to perform a split transaction and/or an indication that a customer would like to use their customer device 150 to facilitate the transaction. In at least some implementations, the messages 506 and 508 are sent responsive to receiving such an indication. That is, the machine-readable code that is displayed on the POS terminal 110 according to the description below may only be displayed in response to receiving such an indication.

The POS terminal 110 may then obtain and display a machine-readable code. In some implementations, the POS terminal 110 may obtain the machine-readable code from the remote interface server 100. For example, the POS terminal 110 may send a message 506 to the remote interface server 100. The message 506 may be referred to as a code request message. The message 506 may include an indication of the base amount of transaction. The indication of the base amount of the transaction may directly indicate the base amount of the transaction or it may be an identifier, such as a location identifier, which indicates where the base amount of the transaction may be obtained. The message 506 may include one or more identifier such as a point-of-sale terminal identifier and/or a merchant identifier. The message 506 may also include random data, such as a random number which may be produced by a random number generator.

In some implementations, the message 506 may include an indication of itemized receipt data. Itemized receipt data may itemize all products or services that are associated with the base mount of the transaction. By way of example, the itemized receipt data may indicate specific items that were ordered from a restaurant. The indication of the itemized receipt data may directly indicate the itemized receipt data or it may be an identifier, such as a location identifier, which indicates where the itemized receipt data may be obtained.

The remote interface server 100 receives the message 506 which includes the base amount of the transaction. In response to receiving the message 506, the remote interface server 100 generates a machine-readable code based on the contents of the message 506.

The machine-readable code may, in some implementations, be a quick response (QR) code. The machine-readable code may encode various data. For example, the machine-readable code may encode the base amount of the transaction. The machine-readable code may encode a transaction identifier. The machine-readable code may encode a point-of-sale terminal identifier and/or a merchant identifier. The machine-readable code may include random data such as the random data provided in the message 506. The machine-readable code may encode the indication of the itemized receipt data.

The machine-readable code may encode a link such as, for example, a web address. The web address is an address associated with a web server that is provided by or is associated with the remote interface server 100. The web address may be a uniform resource locator (URL). The web address may be associated with an interface. That is, the web address may be an address for a web server that serves the interface to a device that has scanned the machine-readable code.

The machine-readable code may encode security or verification data. For example, the machine-readable code may encode a hash. The remote interface server 100 may generate the hash based on other data encoded in the machine-readable code. For example, the hash may be generated based on any one or a combination of: the link/web address, the base amount of the transaction, the point-of-sale terminal identifier and/or a merchant identifier, the transaction identifier and/or the random data.

The machine-readable code may be digitally signed by the remote interface server 100 and/or may encode a digital signature.

In some implementations, at least some of the data that is encoded in the machine-readable code may be encoded as parameters associated with the web address that is encoded in the machine-readable code. For example, any one or a combination of: the hash, the base amount of the transaction, the point-of-sale terminal identifier, the merchant identifier, the transaction identifier, the indication of the itemized receipt data, the random data and/or the digital signature may be encoded as parameters, such as URL parameters, for the URL. Conveniently, in this way, when a customer scans the machine-readable code with a customer device 150, the customer device 150 may be directed to the web address associated with the remote interface server 100 and may pass the web address such data as parameters.

The remote interface server 100 may, after preparing the machine-readable code, send a message 508 to the POS terminal 110. The message 508 includes the machine-readable code. In sending the machine-readable code to the POS terminal 110, the remote interface server 100 causes the machine-readable code to be displayed at the POS terminal 110 which is processing the transaction. The POS terminal 110 receives the message 508 and, in doing so, receives the machine-readable code. The POS terminal 110 may, at 510, display the machine-readable code at a display module 402 (FIG. 4) associated with the POS terminal 110.

The operator of the POS terminal 110 may then ask a customer to scan or read the machine-readable code using a customer device 150.

A customer may point a camera or other scanner associated with the customer device 150 at the displayed machine-readable code while a reader application is enabled on the customer device 150. The customer device 150 at 512 obtains a representation of the machine-readable code. That is, the reader application may decode the machine-readable code in order to obtain data contained therein. In doing so, the reader application may identify the web address included in the machine-readable code. The reader application may then provide a selectable option to activate the web address or it may automatically activate the web address.

The customer device 150 which scanned the machine-readable code, may then send a message 514 to the remote interface server 100. The message may be a request to retrieve content and, more particularly, a request to retrieve an interface. The request may be in the form of an HTTP GET in some implementations. The request may be sent by a web browser associated with the customer device 150 in at least some implementations. For example, the reader application may pass a URL and any associated URL parameters decoded from the machine-readable code to the web browser which then uses the URL, complete with any parameters, to retrieve the interface.

The remote interface server 100 receives the message 514. That is, the remote interface server 100 receives a request from the customer device 150 for the interface and receives any data that may be passed to the remote interface server 100 as, for example, URL parameters. Accordingly, the request received at the remote interface server 100 may reference any one or a combination of: the base amount of the transaction, the transaction identifier, the hash, the digital signature, the random data, the point-of-sale identifier, the indication of the itemized receipt data and/or the merchant identifier.

In some implementations, in response to receiving the message 514, the remote interface server 100 may, at 516, verify the message 514. That is, the remote interface server 100 may verify the request. Such verification may be based on the hash, the digital signature and/or the random data. The verification may, for example, ensure that the request is not associated with a replay attack, that the data has not been tampered with and/or that the request was generated based on an authorized machine-readable code. The verification that the request was generated based on an authorized machine-readable code may be based on the digital signature. That is, the remote interface server 100 may verify that the signature is a valid signature. The verification that the request was not associated with a replay attack may rely on the random data. The hash may be used to verify that the data has not been tampered with.

After the remote interface server 100 verifies the request and, in response to receiving the request, the remote interface server may cause the device that scanned the machine-readable code to output an interface that includes a prompt for input of an indication to separate the transaction into multiple transaction parts and a prompt for input of one or more parameters indicating how the transaction is to be separated. More specifically, the remote interface server 100 sends a message 518 to the customer device 150. The message may include the interface.

Figure 6:
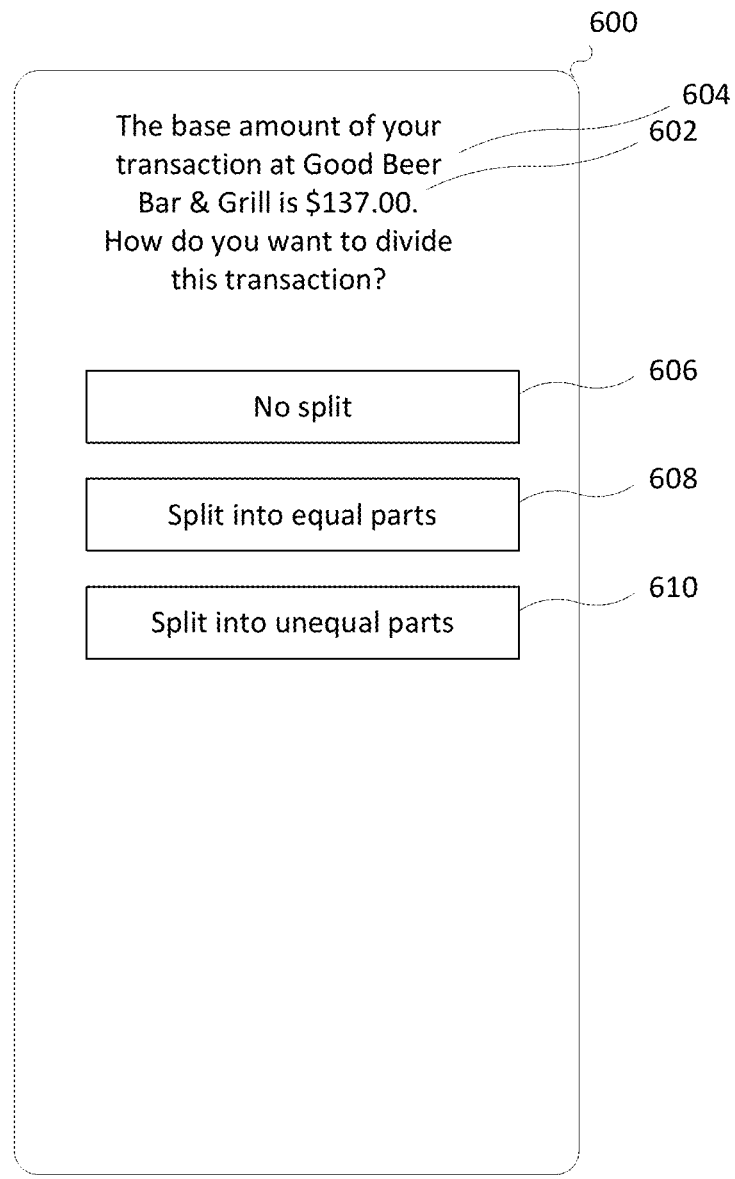
FIG. 6 shows an example interface that may be displayed on a customer device.
Figure 7:
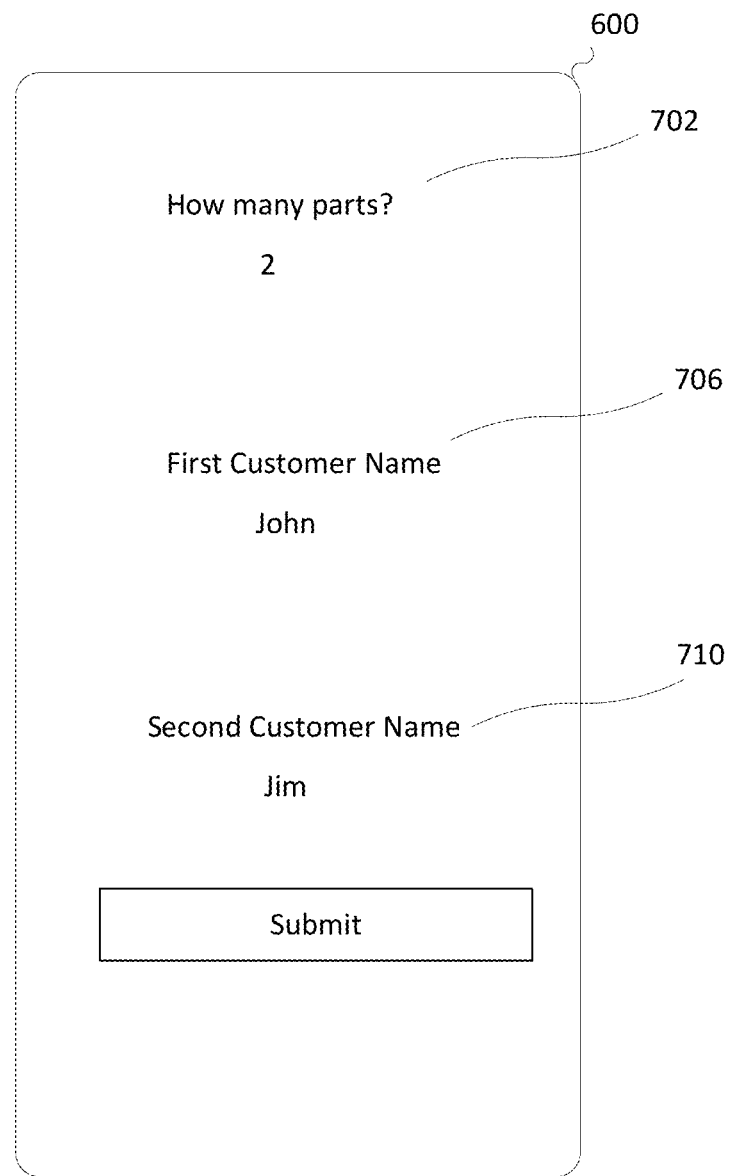
FIG. 7 shows a further screen of an example interface that may be displayed on a customer device.
Figure 8:
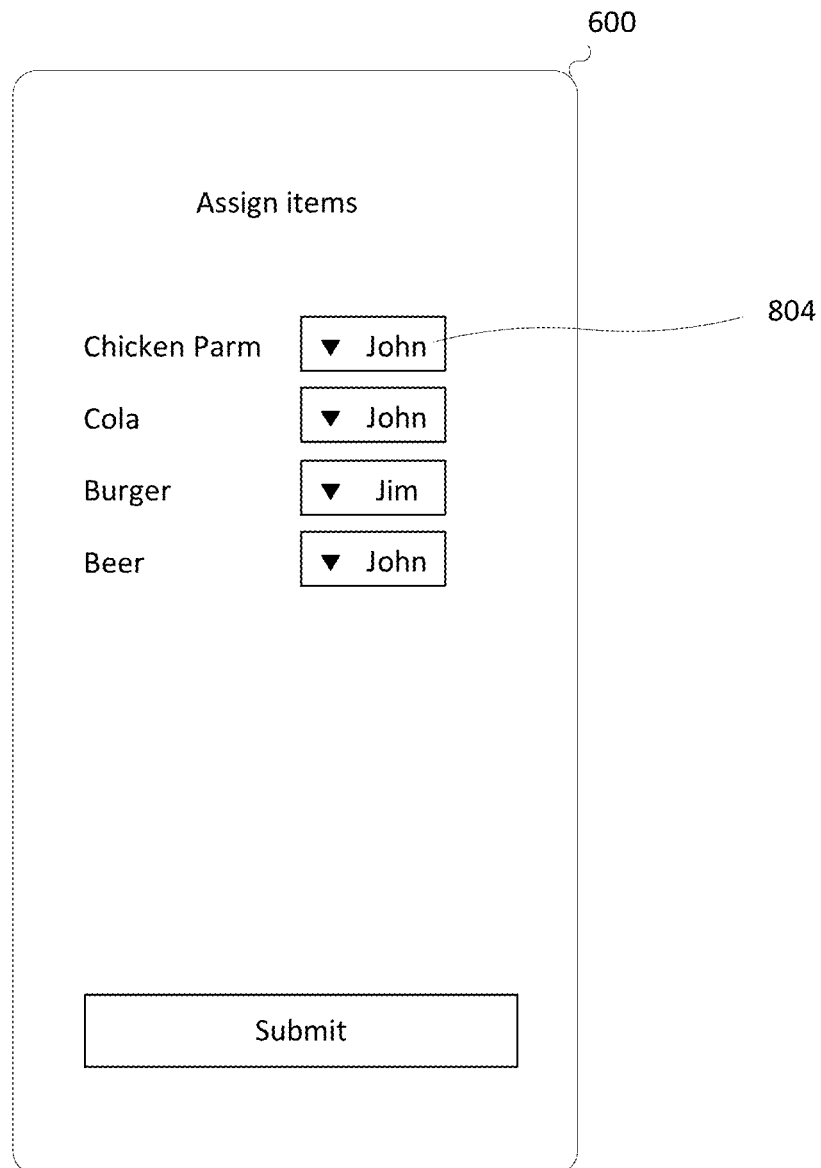
FIG. 8 shows a further screen of an example interface that may be displayed on a customer device.

The interface may be a web page and may be displayed in a web browser on the customer device 150. An example interface 600 is illustrated in FIGS. 6 to 8. The interface may include a base amount indicator 602 indicating the base amount of the transaction and/or a merchant indicator 604 indicating a merchant associated with the transaction as indicated by the merchant identifier.

The interface may be a generic interface that is the same for all merchants or a plurality of merchants or it may be a merchant-specific interface that is applicable for a particular merchant. For example, while not illustrated in FIGS. 6 to 8, the interface 800 may include a logo for the merchant. By way of example, the interface 600 may be retrieved by the remote interface server 100 from a data store or memory based on the merchant identifier.

The interface may include a prompt. The prompt may, as illustrated in FIGS. 6 to 8, prompt for input of an indication to separate the transactions into multiple transaction parts. The prompt may, as further illustrated in FIGS. 6 to 8, prompt for input for one or more parameters indicating how the transaction is to be separated.

As illustrated in FIG. 6, the interface 600 may include one or more of: a prompt 606 (FIG. 6) for an indication of whether the transaction should not be split, a prompt 608 (FIG. 6) for an indication of whether the transaction is to be split into equal parts, a prompt 610 (FIG. 6) for an indication of whether the transaction is to be split into unequal parts, a prompt 702 (FIG. 7) for an indication of a number of parts into which the transaction is to be split, one or more prompts 706, 710 (FIG. 7) for identifiers, such as names, associated with each transaction part, and a prompt 804 (FIG. 8) to associate an item including in the transaction with a particular transaction part.

In at least one implementation, the interface may include a selectable option for inputting a parameter associated with a transaction by using an image. By way of example, interface 600 may include a selectable option to capture on image using the customer device 150 and/or to upload an image from the customer device 150. In some implementations, the selectable option may be an option to determine a parameter associated with the transaction by capturing a selfie. That is, the customer device 150 may, using the selectable option, send an image to the remote interface server 100. The image may purport to be of a plurality of individuals. Each of the individuals may be associated with a respective transaction part of the multiple transaction parts that the transaction is to be split into. The remote interface server 100 may, upon receiving the image, determine a number of the plurality individuals. The remote interface server 100 may do so using facial recognition techniques, for example. The number of the plurality of individuals may be used to determine a number of transaction parts for the transaction. For example, if three people are identified, the remote interface server 100 may determine that the transaction is to be split into three parts. In at least some implementations, the remote interface server 100 may prompt the customer device 150 for input to confirm that the number of transaction parts was correctly determined.

In some implementations, the interface, which may include the prompt(s), may generate one or more of the prompts audibly to assist a visually-impaired operator of the customer device 150. That is, the interface may be output at a speaker associated with the customer device 150.

Referring again to FIG. 5, the customer device 150 receives the message 518 and displays the interface at 520. The customer device 150 then receives, at 522, input via the interface. The input may be a response to the prompt(s). The customer device 150 then sends a message 524 to the remote interface server 100. The message 524 may include an indication of a response to the prompt(s). By way of example, in at least some implementations, the message may include an input of an indication to separate the transaction into multiple transaction parts and one or more parameters indicating how the transaction is to be separated. By way of example, the parameters may include an indication of a number of transaction parts, identifiers, such as names, that are each associated with a respective one of the transaction parts, and/or an indicator defining a respective size of each of the multiple transaction parts. Such parameters may be received at the remote interface server 100 in a single message or in multiple messages.

As noted above, the parameters may include an indication of a number of parts of the transaction. The number of transaction parts may represent the number of parts into which the transaction is to be split. For example, it may be that three people wish to split a bill and so the number of transaction parts in this example is three. The number of transaction parts may be used to control the number of times that a POS terminal will prompt for use of a physical token to complete a transaction.

As noted above, the parameters may include identifiers, such as names, that are each associated with a respective one of the transaction parts. As illustrated in FIG. 7, the interface 600 may allow a customer to input such identifiers. By way of example, the customer can input a name that is associated with each transaction part. The identifier may be used to allow the POS terminal to indicate which of the transaction parts is being processed at a given time. For example, the POS terminal may display "Please insert or tap John's credit card to process John's portion of this transaction."

The identifier may be input through text entry within a text input field on the interface 600 or it may be input another way. For example, in some instances the identifier may be input through selection of a contact record on the customer device 150.

As noted above, the parameters may include an indicator defining a respective size of each of the multiple transaction parts. This indicator may take a variety of forms. For example, in some instances, it may indicate that the transaction parts are to be equal parts. In some instances, it may indicate a percentage of a total amount for each transaction part. By way of example, it may indicate that a first part represents 40% of the total amount and a second part represents 60% of the total amount. In another example, the indicator may indicate a defined amount, such as a dollar amount, that is associated with each transaction part. In another example, the indicator may associate each item that is related to the transaction with a respective one of the transaction parts. For example, the indicator may associate each item that is related to the transaction with a respective one of the transaction parts using an associated name.

In at least some implementations, the interface 600 may accept input of an optional amount to be associated with one or more of the transaction parts. The optional amount may be, for example, a tip. In some instances, each transaction part may be associated with a different entity and the entity associated with a particular part may define an optional amount that is to be applied to that part. For example, each party that is involved in the split may define a tip for their portion of the transaction. This may be done in various ways. For example, one or more of the optional amounts may be input through the interface displayed on the customer device 150. In some instances, other customer devices associated with other entities involved in the transaction may also be used in addition to the customer device 150. For example, in one possible implementation, the interface 600 may be configured to accept input of a messaging address associated with one or more such entities. The messaging address may be an email address or a phone number that may be used for SMS messages. In such an example, the remote interface server 100 may send a message to another customer device using such an address. This message may provide access to a selectable option for inputting an optional amount. For example, the message may include a link to an interface that allows for input of an optional amount, such as a tip, that is to be associated with a particular transaction part. The recipient of the message may input an optional amount for their respective transaction part using the interface and the optional amount may then be received at the remote interface server 100.

Other methods of allowing multiple customer devices to be used for a single transaction to, for example, allow multiple entities to input parameters for the transaction are contemplated. For example, in some instances, multiple customer devices may be permitted to scan the same machine-readable code. In some instances, after doing so the customer devices may each receive the interface 600 and any of the customer devices may input parameters indicating how the transaction is to be separated. In some instances, the interface may allow each customer device to claim items that are associated with the transaction and doing so may cause the remote interface server 100 to adjust the amount of a transaction part associated with that customer. In some instances, any unclaimed items may be split among all parties. For example, each party may claim their own main course dish at a restaurant and one or more shared appetizer that is unclaimed may be split. Put differently, the remote interface server 100 may include any unclaimed items in the amount of all transaction parts by splitting an amount associated with such unclaimed items equally across all transaction parts.

In some instances, when multiple customer devices scan the machine-readable code, they may each receive a shared user interface. The shared user interface may be configured as a collaboration room where users see a similar interface and changes made by one customer device are automatically propagated to other customer devices by updating the display on such devices. For example, it a customer device claims a particular item associated with the transaction, other devices may be updated to remove that item from a list of unclaimed items that is displayed on such customer devices.

In some instances, multiple customer devices may be used serially to input the parameters indicating how the transaction is to be separated. For example, one customer device may be used to input a number of parameters through an interface and the interface may then be handed off to another customer device to input further parameters. This handoff may continue until all parameters have been input. The handoff may be performed, for example, by displaying a machine-readable code on a first of the customer devices which may then be scanned by a second of the customer devices to complete the handoff. The machine-readable code may include information that is the same or similar to the machine-readable code described above.

After the remote interface server 100 receives the input of the indication to separate the transaction into multiple parts and the one or more parameters indicating how the transaction is to be separated, it may perform processing based on the parameters. For example, the remote interface server 100 may determine an amount of each transaction part. By way of example, if the parameters indicate that the transaction is to be split equally, the remote interface server 100 may determine an amount of each transaction part by dividing the total or base amount of the transaction by the number of transaction parts. By way of further example, if the parameters associate particular items with particular transaction parts, the remote interface server 100 may determine the amount of each transaction part based on an amount that is associated with each of the particular items.

After the remote interface server 100 receives the input of the indication to separate the transaction into multiple parts and the one or more parameters indicating how the transaction is to be separated, the remote interface server 100 may then send, to the point-of-sale terminal 110, a message that configures the point-of-sale terminal 110 to separate the transaction in accordance with the one or more parameters.

In some implementations, the remote interface server 100 may push the message that configures the point-of-sale terminal 110 to separate the transaction in accordance with the one or more parameters to the POS terminal. In other implementations, the message may be provided using a pull technique. For example, the POS terminal may send a message 528 to the remote interface server 100. The message 528 is a request for an indication of the one or more parameters indicating how the transaction is to be split. The request may be sent periodically (e.g., the POS terminal 110 may repeatedly attempt to retrieve the indication of the one or more parameters indicating how the transaction is to be split from the remote interface server 100 until it becomes available) or it may be sent in response to input received (at 526) at an input module of the POS terminal. The input indicates readiness to complete the transaction. For example, it may be that the operator of the POS terminal, who is an employee of the merchant, provides an input at the POS terminal after their customer has indicated that they have finished providing the parameter(s) through the interface 600 provided on the customer device 150. Then, when the POS terminal 110 receives such input, it may send the message 524 requesting the indication of the one or more parameters indicating how the transaction is to be split.

The remote interface server 100 then sends the indication of the one or more parameters indicating how the transaction is to be split in a message 530. That is, the remote interface server 100 may send transaction apportionment data which may also be referred to as apportionment data herein. The transaction apportionment data indicates how the transaction is to be split and it may be sent and it may be based on the data input through the interface 600.

In some instances, the message 530 may be sent to the POS terminal based on an identifier such as the POS identifier and/or the transaction identifier. One or both such identifiers may be included in the message 528 and used by the remote interface server 100 to identify the appropriate response to the prompt to be used to provide the message 530.

The message 530 may include one or more of the parameters received through the interface 600 and/or data determined based on such parameters. By way of example, the message may include or be based on any one or a combination of: an indication of a number of transaction parts, identifiers, such as names, that are each associated with a respective one of the transaction parts, and/or an indicator defining a respective size (e.g., an amount) of each of the multiple transaction parts.

The POS terminal 110 receives the message 530 (and thus, the indication of the response to the prompt) and displays, at 532, a transaction completion prompt based on the message. More particularly, the message 530 configures the POS terminal 110 to separate the transaction in accordance with the one or more parameters. For example, the message 530 may configure the POS terminal 110 to output iterative prompts. Iterative prompts are prompts that are displayed iteratively; i.e., one after another. Each of the iterative prompts may prompt for input of a token associated with a respective transaction part. That is, each prompt may prompt for completion of a particular one of the transaction parts through use of a respective physical token at the physical token reader.

Such physical tokens may be configured for tap-style payments in which the physical token is placed in a communication range of a physical token reader to allow physical token data to be read from the physical token. By way of example, physical tokens may include any one or a combination of: payment cards (which may also be referred to as value transfer cards) and computing devices having a representation of a payment card stored thereon. By way of example, the physical token may be a mobile device having a mobile wallet that stores a representation of a payment card.

A physical token may be connected to one or more accounts (such as banking accounts) that store data and/or resources accessible to the cardholder. By way of example, the physical token may be associated with a bank account and/or a credit card account. The physical token may act as a credit card or a debit card.

The physical token may be configured for near-field communication (NFC) payment processing or for wireless communication-based payment processing of another type.

At 532 a first one of the transaction completion prompts is displayed at the POS terminal 110. The first one of the transaction completion prompts requests completion of a first transaction part. The transaction completion prompt may display an identifier, such as a name, associated with the first transaction part and/or may indicate a respective size of the associated transaction part. The indicator of the respective size may have been determined from an indicator of a respective size included in or determined from the parameter(s). For example, the transaction completion prompt may display an amount associated with the first transaction part. The amount may include a respective portion of the base amount of the transaction that is defined for the first transaction part and may include an optional amount, such as a tipping amount, if such an optional amount has been defined for the first transaction part. By way of example, the transaction completion prompt may be: "John, please tap or insert your payment card to pay $24.34."

The transaction completion prompt may prompt for use of a physical token to complete the transaction. The prompt may prompt the customer to insert a payment card at a physical token reader, to swipe payment card having a magnetic strip and/or to tap a physical token.

A customer may then manipulate their physical token in accordance with the prompt to allow the POS terminal 110 to read the physical token. The POS terminal obtains physical token data from the physical token at 534. Physical token data may include, for example, a PAN, an expiry date, verification data (e.g., a CVV number) and/or a token holder. The token holder may identify an entity that the token was issued to and/or is associated with.

The POS terminal 110 then sends a transaction processing request to an appropriate transfer rail 120 in a message 536. The POS terminal 110 may identify the appropriate transfer rail based on the physical token data and may send the message 536 to the identified transfer rail 120. The transaction processing request may include or be based on the physical token data. The transaction processing request includes an amount of the transaction, which may be the total amount that includes both the base amount and the optional amount obtained through input at the customer device.

The transfer rail 120 then identifies an issuer system 124 to relay the message to based on the physical token data in the message 536. The transfer rail 120 then relays the message to the identified issuer system 124 as a message 538.

The issuer system 124 performs a real-time adjudication procedure based on the message 538 in order to instantly determine whether the transaction is to be approved or declined. Then, the issuer system 124 sends an indication of whether the transaction was approved or declined in a message 540 through the transfer rail 120. The transfer rail 120 then relays this message to the POS terminal 110 as a message 542. The POS terminal then, at 544, displays a transaction result indicator, indicating whether the transaction was approved or declined.

After the first transaction part has been processed, the POS terminal 110 may prompt for completion of the second transaction part at 546. Operation 546 may be performed in a manner similar to operation 532, except the prompt may be different at operation 546 since operation 546 prompts for completion of a different one of the transaction parts. The prompt at operation 546 may, therefore, include a different identifier (e.g., name) than the prompt at operation 532. By way of further example, the prompt at operation 546 may include a different amount than the prompt at operation 546 (or, if the transaction is being split equally it may include the same amount as at operation 532).

The second transaction part may then be processed in a manner similar to that described above for the first transaction part. For example, a second customer may manipulate their physical token (i.e., a second physical toke) in accordance with the prompt to allow the POS terminal 110 to read the physical token. The POS terminal obtains physical token data from the physical token at 546. Physical token data may include, for example, a PAN, an expiry date, verification data (e.g., a CVV number) and/or a token holder. The token holder may identify an entity that the token was issued to and/or is associated with.

The POS terminal 110 then sends a transaction processing request to an appropriate transfer rail 120 in a message 548. The POS terminal 110 may identify the appropriate transfer rail based on the physical token data and may send the message 548 to the identified transfer rail 120. The transaction processing request may include or be based on the physical token data. The transaction processing request includes an amount of the transaction, which may be the total amount that includes both the base amount and the optional amount obtained through input at the customer device.

The transfer rail 120 then identifies an issuer system 124 to relay the message to based on the physical token data in the message 550. The transfer rail 120 then relays the message to the identified issuer system 124 as a message 552.

The issuer system 124 performs a real-time adjudication procedure based on the message 552 in order to instantly determine whether the transaction is to be approved or declined. Then, the issuer system 124 sends an indication of whether the transaction was approved or declined in a message 554 through the transfer rail 120. The transfer rail 120 then relays this message to the POS terminal 110 as a message 556. The POS terminal then, at 558, displays a transaction result indicator, indicating whether processing of the second transaction part was approved or declined.

If there are only two parts, then processing may end. However, if there are a greater number of parts the further transaction parts may be processed by displaying further prompts (similar to operation 532) and by processing a respective transaction part with an associated physical token in the manner described with reference to 534 to 544.

Each of the systems illustrated in FIG. 5 may be considered to perform an associated method. By way of example, the issuer system 124 performs a method that includes the operations described as being performed by the issuer system 124 or a portion thereof, the transfer rail 120 performs a method that includes the operations described as being performed by the transfer rail 120 or a portion thereof, the POS terminal 110 performs a method that includes the operations described as being performed by the POS terminal 110 or a portion thereof, the remote interface server 100 performs a method that includes the operations described as being performed by the remote interface server 100 or a portion thereof, and the customer device 150 performs a method that includes the operations described as being performed by the customer device 150 or a portion thereof. A memory associated with each of these systems may include computer-executable instructions which, when executed, configure the associated system to perform the associated method, or a portion thereof.

Figure 9:
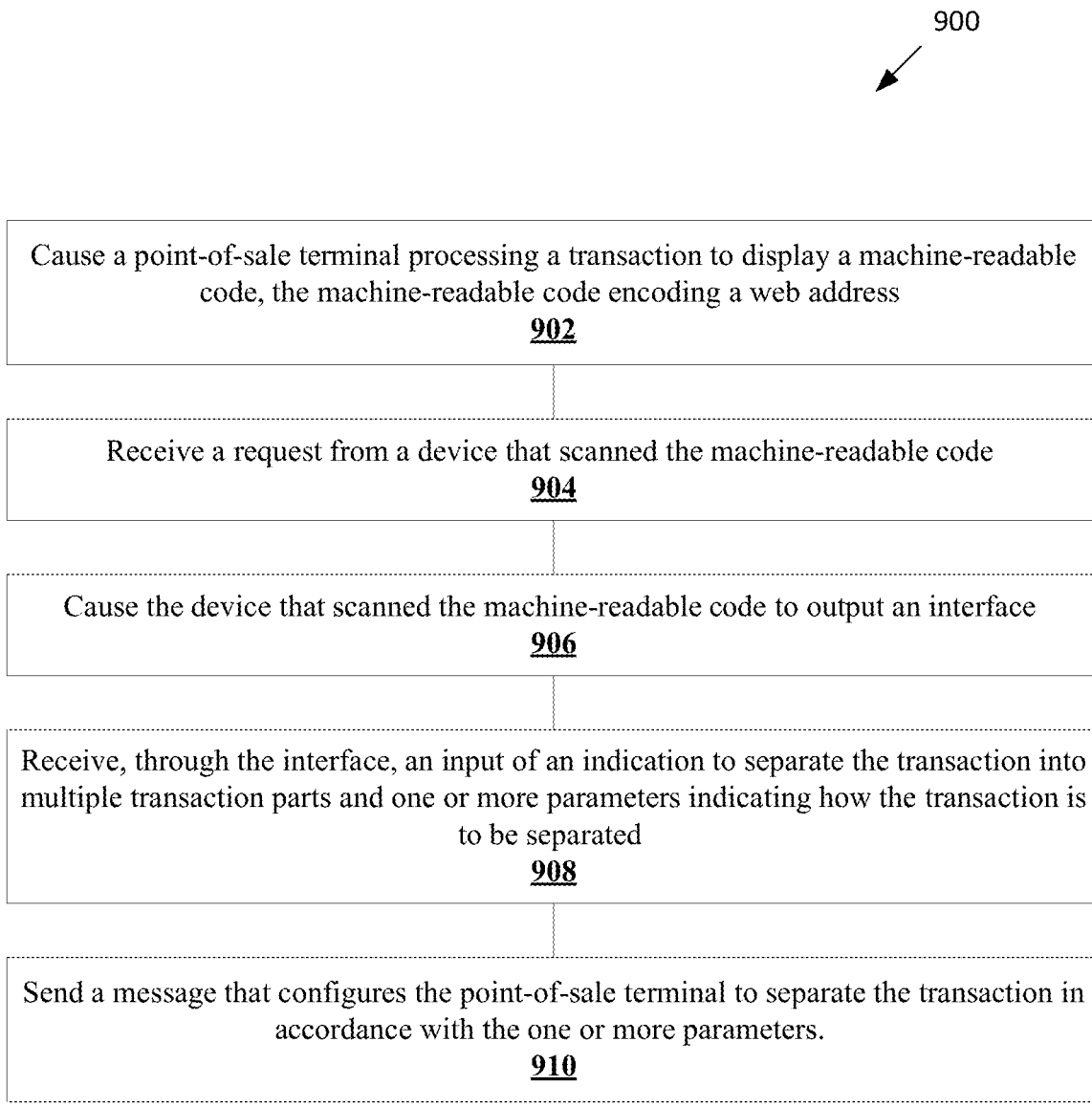
FIG. 9 illustrates, in flowchart form, an example method that may be performed by a server.

By way of example, reference is now made to FIG. 9, which shows, in flowchart form, an example method 900 that may be performed by a remote interface server 100.

Operations starting with operation 902 and continuing onward are performed by the processor 210 (FIG. 2) of a computing device 200 executing software comprising instructions such as may be stored in the memory 220 of the computing device 200. For example, the operations of the method 900 may be performed by the remote interface server 100. More particularly, processor-executable instructions may, when executed, configure a processor 210 of the remote interface server 100 to perform the method 900. In some embodiments, the operations of method 900 may be performed by the remote interface server 100 in conjunction with one or more other computing systems, such as the POS terminal 110 and/or a customer device 150.

The operations 902 and onward may be the same or similar to those described above with reference to the sequence diagram 500 of FIG. 5 and the discussion of the operations 902 and onward will be made by reference to the operations in the sequence diagram 500.

At an operation 902, the remote interface server 100 may cause a point-of-sale terminal processing a transaction to display a machine-readable code. The machine-readable code may encode a web address. Operation 902 may be performed in the manner described above with reference to operations 502 to 510 of the sequence diagram 500.

At an operation 904, the remote interface server 100 may receive a request from a device that scanned the machine-readable code. The request may, for example, be received from a customer device 150. The request may be received at the web address. Operation 904 may be performed in the manner described above with reference to message 514 of the sequence diagram 500.

At an operation 906, the remote interface server 100 may, in response to receiving the request, cause the device that scanned the machine-readable code to output an interface. Operation 906 may be performed in the manner described above with reference operation 516 of the sequence diagram 500. As noted in the discussion of the sequence diagram 500, the machine-readable code may encode a base amount of a transaction and the request from the device may reference the base amount of the transaction and the interface 600 may indicate the base amount of the transaction.

At an operation 908, the remote interface server 100 may receive, through the interface, an input of an indication to separate the transaction into multiple transaction parts and one or more parameters indicating how the transaction is to be separated. Operation 908 may be performed in the manner described above with reference to 518 to 530 of the sequence diagram 500. As noted in the discussion of the sequence diagram 500, the one or more parameters may include various data including, for example, a plurality of identifiers. Each identifier may be associated with a respective one of the transaction parts. The identifiers may include a plurality of names, for example.

By way of further example, the parameters may include an indicator defining a respective size of each of the multiple transaction parts. For example, the parameters may indicate an amount each of the transaction parts. In some instances, the indicator defining the respective size of the transaction parts may indicate that the transaction parts are to be equal parts (i.e., of equal size). In some implementations, the indicator defining the respective size may associate each item that is related to the transaction with a separate transaction part. For example, the customer device may, via the interface 600, associated specific items with specific transaction parts. In some implementations, the indicator defining the respective size may associate each item that is related to the transaction with a respective one of the transaction parts using an associated identifier, such as an associated name. For example, the indicator may indicate that the "Jim" is associated with the "burger."

At an operation 910, the remote interface server 100 may send, to the point-of-sale terminal, a message that configures the point-of-sale terminal to separate the transaction in accordance with the one or more parameters. Operation 910 may be performed in the manner described above with reference to operations 528 to 530 of the sequence diagram 500. As noted in the discussion of the sequence diagram 500, the machine-readable code may encode a transaction identifier and the request from the device may reference the transaction identifier, and the message may be sent to the point-of-sale terminal based on the transaction identifier. The message sent at operation 910 may configure the point-of-sale terminal to output iterative prompts. These prompts may iteratively prompt for input of a token associated with respective transaction part using the plurality of identifiers. In at least some implementations, the iterative prompts may each indicate a size of an associated one of the multiple transaction parts as determined from the indicator defining the respective size. The iterative prompts may prompt for completion of a transaction part using a respective physical token.

While not illustrated in FIG. 9, in some implementations, the one or more parameters may include an image captured at the device that scanned the machine-readable code. The image may purport to be of a plurality of individuals, each individual associated with a respective transaction part of the multiple transaction parts. The method may further include determining a number of the plurality of individuals from the image and the message sent at operation 910 may indicate the number of the plurality of individuals.

Figure 10:
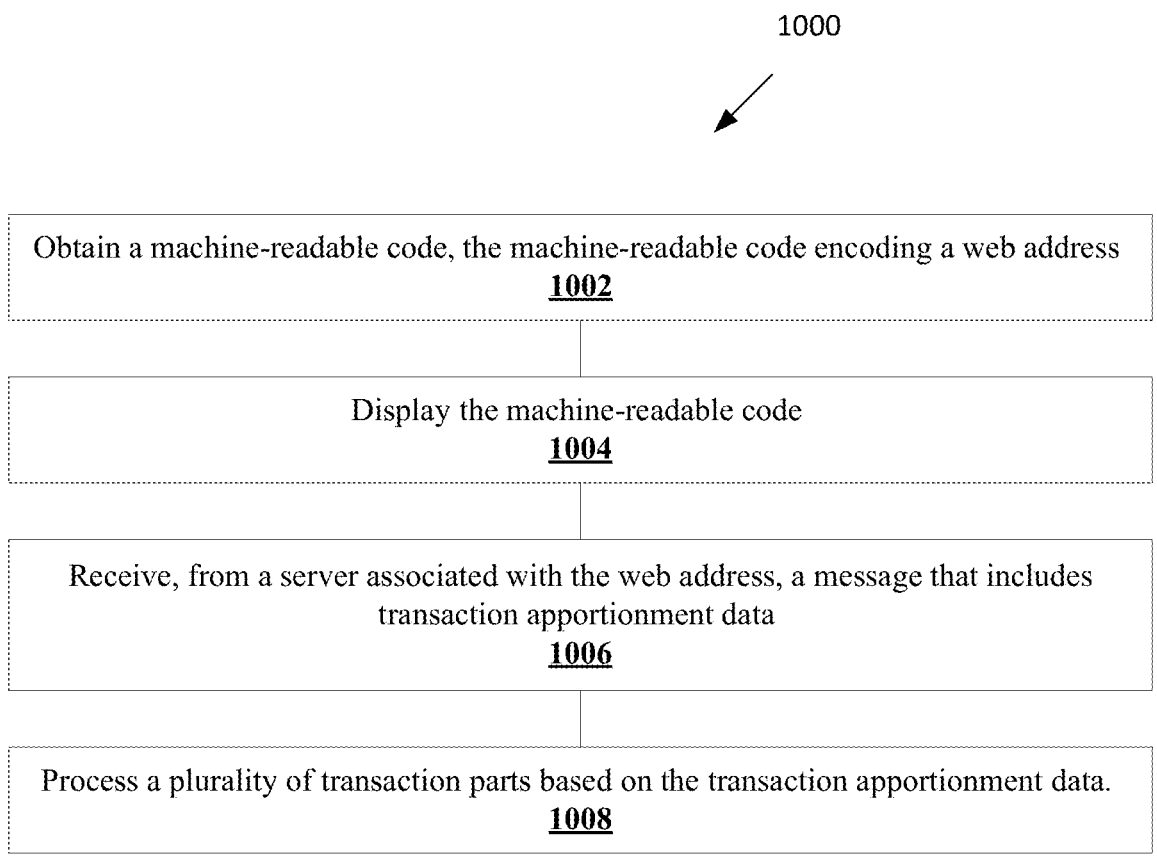
FIG. 10 illustrates, in flowchart form, an example method that may be performed by a point-of-sale terminal.

Reference is now made to FIG. 10, which shows, in flowchart form, an example method 1000 that may be performed by a POS terminal 110.

Operations starting with operation 1002 and continuing onward are performed by the processor 210 (FIG. 2) of a computing device 200 executing software comprising instructions such as may be stored in the memory 220 of the computing device 200. For example, the operations of the method 1000 may be performed by the POS terminal 110. More particularly, processor-executable instructions may, when executed, configure a processor 210 of the POS terminal 110 to perform the method 1000. In some embodiments, the operations of method 1000 may be performed by the POS terminal 110 in conjunction with one or more other computing systems, such as the remote interface server 100.

The operations 1002 and onward may be the same or similar to operations described above with reference to the sequence diagram 500 of FIG. 5 and the discussion of the operations 1002 and onward will be made by reference to the operations in the sequence diagram 500.

At an operation 1002, the POS terminal 110 obtains a machine-readable code. The machine-readable code may encode a web address. The machine-readable code may be obtained as described above with reference to 504 to 508 of the sequence diagram 500.

Next, at an operation 1004, the POS terminal 110 displays the machine-readable code. Operation 1004 may be performed as described above with reference to the sequence diagram 500 of FIG. 5 and, in particular with reference to 510.

Next, at an operation 1006, the POS terminal 110 may receive, from a server associated with the web address, a message. The message may include transaction apportionment data. That is, the message may include information defining how the transaction is to be split. This information may, for example, include a plurality of identifiers, such as a plurality of names. Each identifier may be associated with a respective one of the transaction parts. For example, a first transaction part may be associated with a first name and a second transaction part may be associated with a second name and so on.

The transaction apportionment data may include an indicator defining a respective size of each of the transaction parts. By way of example, the size may be defined as an amount represented in a particular currency. The indicator defining the respective size may, in some implementations, indicate that the transaction parts are to be equal parts. In some instances, the indicator defining the respective size may associate each item that is related to the transaction with a respective one of the transaction parts. This association may, in some implementations, be done using a name. For example, a first identifier (e.g., "Joe") may be associated with a first size (e.g., $20.45), while a second identifier (e.g. "John") may be associated with a second size (e.g. $30.54).

Operation 1006 may be performed as described above with reference to the sequence diagram 500 of FIG. 5 and, in particular with reference to 528 to 530.

At an operation 1008, the method 1000 may include processing a plurality of transaction parts based on the transaction apportionment data. Operation 1008 may be performed as described above with reference to the sequence diagram 500 of FIG. 5 and, in particular with reference to 534 to 558.

Accordingly, in at least some implementations processing the plurality of transaction parts based on the transaction apportionment data may include iteratively processing the transaction parts until all transaction parts have been processed. For example, the POS terminal may output iterative prompts for input of a token associated with a respective transaction part using the plurality of identifiers. Accordingly, the iterative prompts may prompt for completion of the transaction part using a respective physical token. For example, the POS terminal may first prompt for a first customer, for example, Joe, to use a first physical token and may process a first transaction part using the first physical token and may then prompt for a second customer, for example, John, to use a second physical token and may process the second transaction part using the second physical token.

In some instances, the iterative prompts may each indicate a size of an associated one of the multiple transaction parts as determined from the indicator defining the respective size. For example, the first prompt may indicate an amount of the first transaction part (e.g., $20.45) and the second prompt may indicate an amount of the second transaction part (e.g., $30.54).

Figure 11:
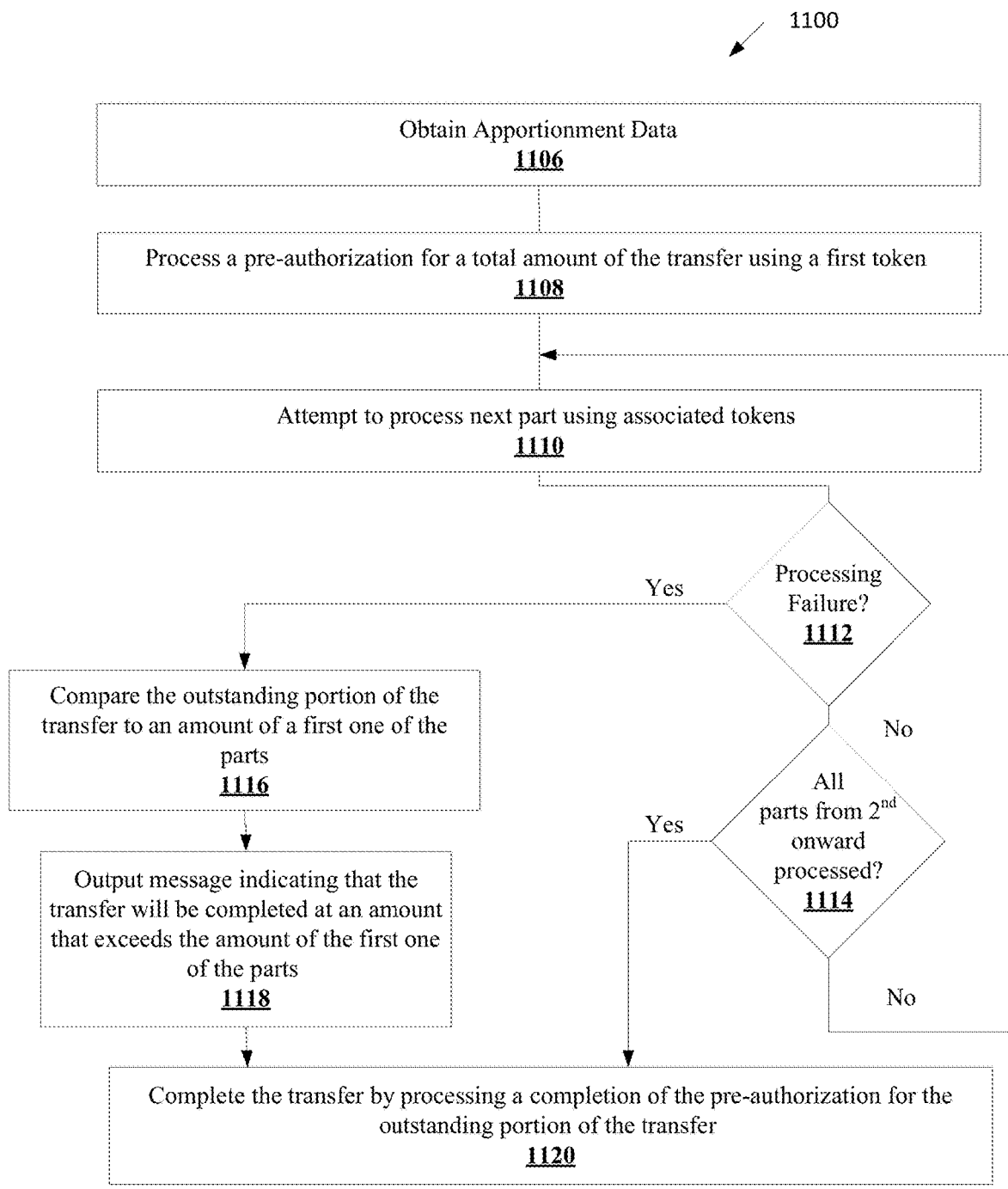
FIG. 11 illustrates, in flowchart form, an example method that may be performed by a computing device.

Reference is now made to FIG. 11, which shows, in flowchart form, an example method 1100 that may be performed by a computing device. The computing device may, in at least some implementations, be or include a POS terminal 110. In some instances, the computing device may include a back-end server that is communicatively connected to the POS terminal 110.

Operations starting with operation 1106 and continuing onward are performed by the processor 210 (FIG. 2) of a computing device 200 executing software comprising instructions such as may be stored in the memory 220 of the computing device 200. For example, the operations of the method 1100 may be performed in whole or in part by the POS terminal 110. More particularly, processor-executable instructions may, when executed, configure a processor 210 of the POS terminal 110 to perform the method 1100. In some embodiments, the operations of the method 1100 may be performed by the POS terminal 110 in conjunction with one or more other computing systems, such as the remote interface server 100 and/or another server. The POS terminal 110 may include features such as those described above, including, for example, a physical token reader, a display module, and an input module.

At operation 1106, the method 1100 includes obtaining apportionment data for a transfer. The transfer may also be referred to as a transaction herein. The apportionment data may also be referred to herein as transaction apportionment data and may include features of the transaction apportionment described above. For example, the apportionment data may define a plurality of parts of the transfer. The transfer may be for a defined amount and a participant in the transfer may have requested that the transfer be split into multiple parts. For example, as noted above, customers at a restaurant may wish to split a bill or a customer may wish to split a bill into multiple parts so that more than one method may be used to complete the transfer. For example, a customer may wish to split a transfer so that multiple credit cards may be used to process the transfer.

The apportionment data may, for example, be obtained from another computing device. For example, in some implementations, the apportionment data may be obtained in the manner described above with reference to FIGS. 5 to 9. For example, the POS terminal 110 may obtain a machine-readable code that encodes a web address in the manner described above with reference to FIGS. 5 to 9. The POS terminal 110 may then display the machine-readable code, as also described above with reference to FIGS. 5 to 9. As described above, a customer device 150 may scan the machine-readable code and, after decoding the machine-readable code, may obtain an interface 600 from a remote interface server. The remote interface server may receive responses to prompts output through the interface 600 and may then send the apportionment data to the POS terminal 110. Accordingly, in some implementations, the apportionment data obtained at operation 1106 may be obtained by receiving a message that includes such data from a server that is associated with a web address encoded in the machine-readable code that was displayed at the POS terminal 110. For example, this message may be the message 530 of the sequence diagram 500 of FIG. 5 and/or the message referenced at operation 910 of the method 900 of FIG. 9 and/or the message referenced at operation 1006 of the method 1000 of FIG. 1008. Put differently, the method 1100 may be performed at operation 1008 of the method 1000 of FIG. 10.

As described above, the message may include information that defines how the transfer/transaction is to be split. For example, the message may include a plurality of identifiers such as names. Each identifier may be associated with a respective one of the parts. The apportionment data may additionally or alternatively include an indicator defining a respective size of each of the transaction parts. By way of example, the size may be defined as an amount represented in a particular currency. The indicator defining the respective size may, in some implementations, indicate that the transaction parts are to be equal parts. In some instances, the indicator defining the respective size may associate each item that is related to the transaction with a respective one of the transaction parts. This association may, in some implementations, be done using a name. For example, a first identifier (e.g., "Joe") may be associated with a first size (e.g., $20.45), while a second identifier (e.g. "John") may be associated with a second size (e.g. $30.54).

In some implementations, the apportionment data may identify a primary part of the transfer. The primary part of the transfer may, for example, be a part of the transfer that is associated with the customer who aided in defining the apportionment data. Put differently, it may be associated with a party that is associated with the customer device 150 on which the interface 600 was output. In some instances, the apportionment data may indicate an order of the processing of parts of the transfer. For example, it may indicate which of the parts of the transfer is a first part, which is a second part, and so on.

The apportionment data may, in other implementations, be received in other ways. For example, the apportionment data may be received from an e-commerce server.

Similar to as discussed above with reference to operation 1008 of the method of FIG. 10, after the apportionment data is received, the computing device may process the transfer in accordance with the apportionment data. This may be done according to operations 1108 and onward of the method 1100 of FIG. 11. Such operations will now be described.

First, at an operation 1108, the method 1100 includes processing a pre-authorization for a total amount of the transfer using a first token. The first token may be a physical token that is associated with an entity identified by an identifier that is included in the apportionment data. In some implementations, computing device may select one of the parts that will be processed using a pre-authorization. Such selection may be based on data included in the apportionment data. For example, the primary part of the transfer, as identified in the apportionment data, may be selected for processing using pre-authorization. By way of further example, a part may be selected based on an indicated order of the processing of the parts of the transfer that is defined in the apportionment data. For example, the part of the transaction that is listed first in the apportionment data may be selected for processing using a pre-authorization.

At operation 1108, the pre-authorization may be processed for a total amount of the transfer. That is, the pre-authorization may be processed for an amount that is the total amount of all of the individual parts of the transfer. A pre-authorization may also be referred to as an authorization hold or a preauth.

To process the pre-authorization using the first token, the computing device may output a prompt for input of a token associated with a first one of the parts. This prompt may include one of the identifiers included in the apportionment data. The prompt may include an indication of the total amount of the transfer. The prompt may indicate that a pre-authorization will be processed for the indicated amount. The prompt may indicate how a payment token is to be input to the computing device. For example, the prompt may indicate that a customer should insert a card or other physical token into a physical token reader or tap the card at the physical token reader.

A customer may then manipulate their physical token in accordance with the prompt to allow the POS terminal 110 to read the physical token. The POS terminal obtains physical token data from the physical token at 534. Physical token data may include, for example, a PAN, an expiry date, verification data (e.g., a CVV number) and/or a token holder. The token holder may identify an entity that the token was issued to and/or is associated with.

The POS terminal 110 then sends a pre-authorization processing request to an appropriate transfer rail 120 in a message. The POS terminal 110 may identify the appropriate transfer rail based on the physical token data and may send the message to the identified transfer rail 120. The pre-authorization processing request may include or be based on the physical token data. The pre-authorization processing request includes an amount of the transfer, which may be the total amount of the transfer.

The transfer rail 120 then identifies an issuer system 124 to relay the pre-authorization processing request to based on the physical token data in the message. The transfer rail 120 then relays the pre-authorization processing request to the identified issuer system 124 as a message.

The issuer system 124 performs a real-time adjudication procedure based on the pre-authorization processing request in order to instantly determine whether the pre-authorization processing request is to be approved or declined. Then, the issuer system 124 sends an indication of whether the pre-authorization processing request was approved or declined in a message through the transfer rail 120. The transfer rail 120 then relays this message to the POS terminal 110. The POS terminal then displays a pre-authorization processing request result indicator, indicating whether the pre-authorization processing request was approved or declined.

After processing the pre-authorization for the total amount of the transfer using the first token, the computing device processes one or more of the parts of the transfer using associated tokens. For example, at an operation 1110, the computing device may attempt to process a next part of the transfer using an associated token. By way of example, a second part of the transfer may be processed. Notably, the processing at operation 1110 does not use a pre-authorization. Rather, one or more parts of the transfers complete processing at operation 1110 without the use of a pre-authorization.

At operation 1110, the computing device may process a next one of the parts using operations that are the same or similar to those described with reference to 532 to 544 of the sequence diagram 500 of FIG. 5. For example, during each iteration of operation 1110, a prompt may be output. The prompt may be displayed at the POS terminal 110. The prompt requests input to facilitate completion of a part of the transfer (e.g., a transaction part). The prompt may be output based on the apportionment data. The prompt may display an identifier, such as a name, associated with the part being processed and/or may indicate a respective size (e.g., amount) of the associated part.

The indicator of the respective size may have been determined from an indicator of a respective size included in or determined from the apportionment data. For example, the prompt may display an amount associated with the part. The amount may include a respective portion of the base amount of the transaction that is defined for the part for which processing is being attempted and may include an optional amount, such as a tipping amount, if such an optional amount has been defined. By way of example, the transaction completion prompt may be: "John, please tap or insert your payment card to pay $24.34."

The prompt may prompt for use of a physical token to complete the transaction. The prompt may prompt the customer to insert a payment card at a physical token reader, to swipe payment card having a magnetic strip and/or to tap a physical token.

A customer may then manipulate their physical token in accordance with the prompt to allow the computing device to read the physical token. The computing device obtains a representation of the associated token. For example, the computing device may obtain physical token data from the physical token. Physical token data may include, for example, a PAN, an expiry date, verification data (e.g., a CVV number) and/or a token holder. The token holder may identify an entity that the token was issued to and/or is associated with.

The computing device then sends a transfer processing request to an appropriate transfer rail 120 in a message. The computing device may identify the appropriate transfer rail based on the physical token data and may send the transfer processing request to the identified transfer rail 120. The message that includes the transfer processing request is intended to effect a transfer in an amount associated with the part being processed.

The transfer processing request may include or be based on the physical token data. The transfer processing request includes an amount of the transaction, which may be the total amount that includes both the base amount and the optional amount obtained through input at the customer device. In some instances, at operation 1110 the computing device may prompt for input of an optional amount that is to be associated with the part being processed and the amount included in the transfer processing request may include the optional amount input at the computing device.

The transfer rail 120 identifies an issuer system 124 to relay the transfer processing request to based on the physical token data. The transfer rail 120 then relays the transfer processing request to the identified issuer system 124.

The issuer system 124 performs a real-time adjudication procedure based on the transfer processing request in order to instantly determine whether processing of the part of the transfer is to be approved or declined. Then, the issuer system 124 sends an indication of whether processing of the part of the transfer was approved or declined in a message through the transfer rail 120. The transfer rail 120 then relays this message to the computing device. The computing device then displays a partial processing result indicator, indicating whether the transfer of the part was approved or declined.

In some instances, processing of the part may successfully complete at operation 1110 and, in other instances, processing may fail. The computing device may operate differently depending on whether the part is or is not successfully processed. When the part is not successfully processed or when processing fails (as determined at operation 1112).

Processing of a transaction part may fail for any one of a number of reasons. For example, in some instances, failure may be said to occur when one or more of the following conditions occurs: a message indicating that a transfer associated with a part has been declined is received from an issuer system, a POS terminal or other system used for the transfer goes offline or otherwise fails, or a timeout period expires (e.g., a timeout following processing of a last part and/or a timeout during an attempted processing of at least one of the parts). There may be other causes of processing failures.

In some implementations, when the computing device detects a processing failure it may trigger the completion of the transfer in response to detecting the processing failure (operation 1120). For example, when a processing failure occurs, the computing device may complete the transfer by processing a completion of the pre-authorization for an outstanding portion of the transfer. The outstanding portion of the transfer is determined by adjusting the total amount of the transfer to account for any processed parts (i.e., any parts successfully processed during one or more iterations of operation 1110).

In at least some implementations, when the computing device detects the processing failure it may, prior to completing the transfer, compare the outstanding portion of the transfer to an amount of a first one of the parts (operation 1116). The first one of the parts may be associated with a first entity and the first entity may be associated with the first token (i.e., the token used for the pre-authorization at operation 1108). Then the computing device may output a message at operation 1118. The message may indicate that the transfer will be completed at an amount that exceeds the amount of the first one of the parts. By way of example, in a hypothetical three-part transfer, each of the parts may be twenty resource units. A pre-authorization may be processed for sixty resource units and a second one of the parts may be processed successfully but a failure may occur which prevents processing of a third one of the parts. As a result, the pre-authorization may be completed for forty resource units rather than for twenty resource units.

In order to complete a pre-authorization, the computing device sends a message to the issuer system 124. This message may be sent via the transfer rail 120. The message indicates a size of the completion, such as an amount. The amount is less than or equal to the amount of the pre-authorization.

If, however, there is no processing failure (as determined at operation 1112) and there remain parts that have yet to be processed (as determined at operation 1114), then processing may resume at operation 1110 where processing of another one of the parts may be attempted. When evaluating whether all parts have been processed (at operation 1114), the computing device may disregard a first part, which is intended to be processed in a different way than the other parts. The first part is intended to be processed in a different way since it is intended to be processed using the same token used for the pre-authorization (i.e., the first token).

Accordingly, the computing device may iteratively process all parts other than a particular one of the parts. As described above, the particular one of the parts is a part that is to be associated with the first token. The computing device may iteratively process the parts by outputting iterative prompts for input of a token associated with a respective part using the plurality of identifiers. At each iteration, a different one of the identifiers may be used (for displaying a prompt) until all identifiers (apart from an identifier associated with the first part) have been used during an iteration of operation 1110.

After all of the parts apart from the first part have been processed, the computing device may, at operation 1120, complete the transfer by processing a completion of the pre-authorization for an outstanding portion of the transfer. The outstanding portion of the transfer is determined by the computing device by adjusting the total amount of the transfer to account for any processed parts. In order to complete a pre-authorization, the computing device sends a message to the issuer system 124. This message may be sent via the transfer rail 120. The message indicates a size of the completion, such as an amount. The amount is less than or equal to the amount of the pre-authorization. If all parts apart from the first part have been successfully processed then the amount is an amount that is associated with a first part.

While FIG. 11 illustrates an example implementation in which any processing failure triggers completion of the pre-authorization, in other implementations a processing failure does not automatically trigger immediate completion. Instead, processing of all remaining parts, apart from a part which is to be completed with the first token (i.e., the token used for the pre-authorization at operation 1108), may be attempted. An example of one such method 1200 is illustrated in FIG. 12.

Figure 12:
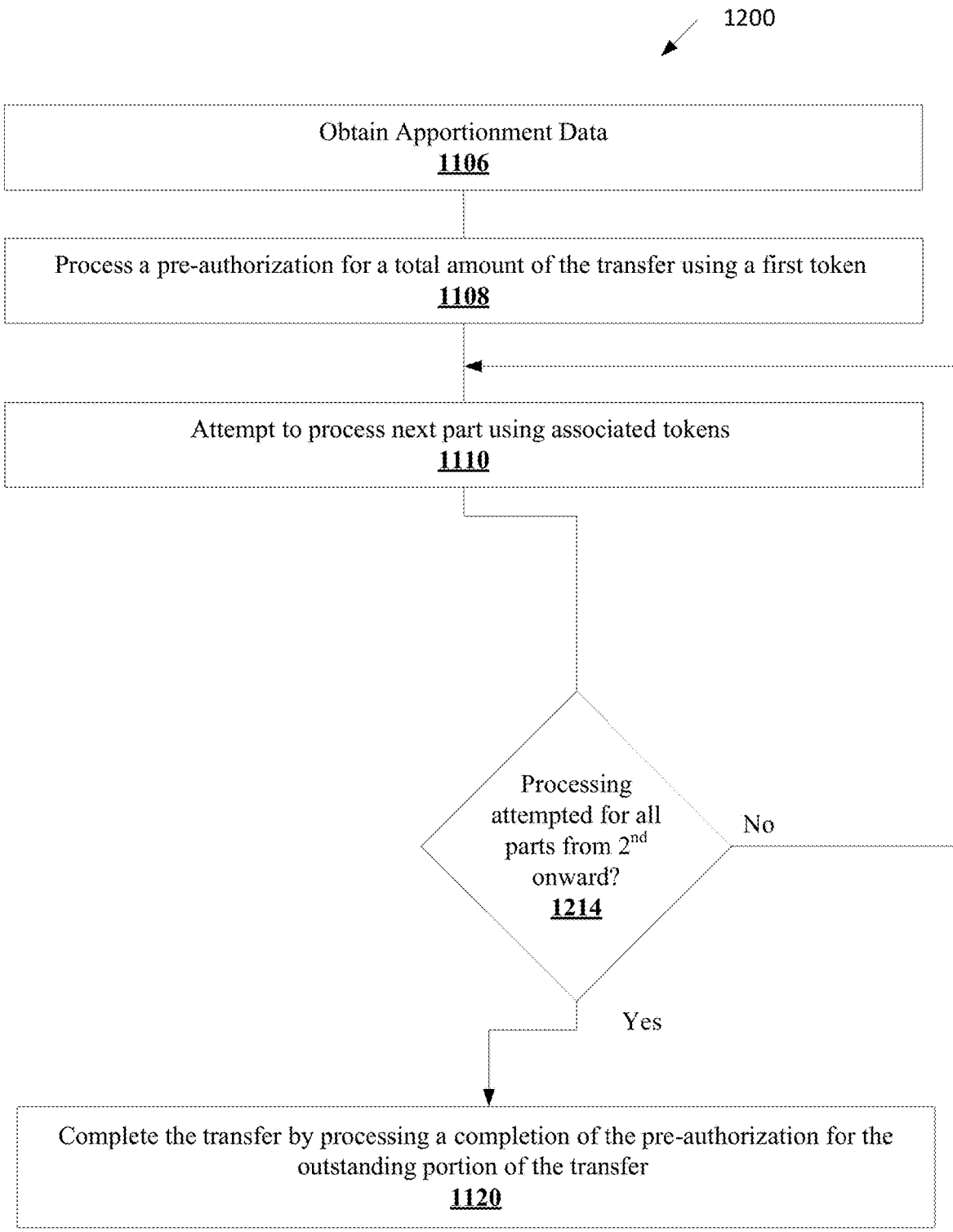
FIG. 12 illustrates, in flowchart form, a further example method that may be performed by a computing device.

Reference is now made to FIG. 12, which shows, in flowchart form, an example method 1200 that may be performed by computing device. The computing device may, in at least some implementations, be or include a POS terminal 110. In some instances, the computing device may include a back-end server that is communicatively connected to the POS terminal 110.

Operations starting with operation 1106 and continuing onward are performed by the processor 210 (FIG. 2) of a computing device 200 executing software comprising instructions such as may be stored in the memory 220 of the computing device 200. For example, the operations of the method 1200 may be performed in whole or in part by the POS terminal 110. More particularly, processor-executable instructions may, when executed, configure a processor 210 of the POS terminal 110 to perform the method 1200. In some embodiments, the operations of method 1200 may be performed by the POS terminal 110 in conjunction with one or more other computing systems, such as the remote interface server 100 and/or another server. The POS terminal 110 may include features such as those described above, including, for example, a physical token reader, a display module, and an input module.

The method 1200 includes features described above with reference to the method 1100 and the discussion of such features will not be repeated at length. Common reference numerals are used to indicate common features.

Operation 1106 may be performed as described above with reference to FIG. 11 to obtain apportionment data and a pre-authorization for a total amount of the transfer may be processed at operation 1108 using a first token, as also described above with reference to FIG. 11. The computing device may then attempt processing of a next part using an associated token (at operation 1110) as described above with reference to FIG. 11. For some parts, processing may succeed and for others processing may fail. In either case, after processing is attempted, the computing device determines whether processing has been attempted for all parts apart from the first part (at operation 1214). If there are more parts to process, another iteration of operation 1110 is performed until processing of all parts apart from the first part has been attempted. When processing of all such parts has been attempted, the computing device completes the transfer by processing a completion of the pre-authorization for the outstanding portion of the transfer (at operation 1120 which is described above with reference to FIG. 11).

One or both of the methods 1100, 1200 illustrated in FIGS. 11 and 12 may be combined with other aspects of this disclosure and other methods described herein or parts of such methods. For example, features such as those described above with reference to FIGS. 5 to 10 may be combined with features described with reference to the method 1100 and/or the method 1200.

The techniques for processing a split transfer described above with reference to FIGS. 11 and 12 may allow systems involved in the process to identify split transfers from other transactions. More particularly, a split transaction, when processed according to the methods described with reference to FIG. 11 or 12 has a particular signature and that signature may be identified to detect that a split transfer was performed. Accordingly, in at least some implementations, a computing device may detect a split transfer by identifying such a signature.

Conveniently, at least some methods and systems described herein may work with numerous types of customer equipment since the customer device 150 need only have the ability to scan a machine-readable code and a web browser to cooperate with other components described herein.

Further conveniently, at least some methods and systems described herein may be deployed through a software update to existing POS terminals without having to obtain all new POS terminals.

Further conveniently, at least some method and systems described herein may be the same irrespective of payment method. For example, a customer could pay using any payment card and the experience remains the same. That is, the customer could use their customer device 150 to input the responses to the prompts and may afterwards determine whether they wish to use credit card or debit card. The experience is the same irrespective of which card they select.

At least some methods and systems described herein may also be used, for example, to aid visually impaired users. As noted above, such customers may be presented with voice prompts instead of visual prompts on their customer device.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A server comprising:
a communications module;
a processor coupled with the communications module; and
a memory coupled to the processor and storing processor-executable instructions which, when executed by the processor, configure the server to:
cause a point-of-sale terminal processing a transaction to display a machine-readable code, the machine-readable code encoding a web address;
receive a request from a device that scanned the machine-readable code, the request received at the web address;
in response to receiving the request, cause the device that scanned the machine-readable code to output an interface;
receive, through the interface, an input of an indication to separate the transaction into multiple transaction parts and one or more parameters indicating how the transaction is to be separated, the one or more parameters including an indication of a total number of the multiple transaction parts, the one or more parameters further including a plurality of identifiers, each identifier being associated with a respective one of the transaction parts; and
send, to the point-of-sale terminal, a message that configures the point-of-sale terminal to separate the transaction in accordance with the one or more parameters and to output, on the point-of-sale terminal, iterative prompts for input of a physical token associated with respective transaction parts using the plurality of identifiers.

2. The server of claim 1, wherein the machine-readable code encodes a base amount of a transaction and wherein the request from the device references the base amount of the transaction and the interface indicates the base amount of the transaction.

3. The server of claim 1, wherein the machine-readable code encodes a transaction identifier and wherein the request from the device references the transaction identifier, and wherein the message is sent to the point-of-sale terminal based on the transaction identifier.

4. The server of claim 1, wherein the one or more parameters include an image captured at the device that scanned the machine-readable code, the image purporting to be of a plurality of individuals, each individual associated with a respective transaction part of the multiple transaction parts, and
wherein the instructions configure the server to determine a number of the plurality of individuals from the image and the message indicates the number of the plurality of individuals.

5. The server of claim 1, wherein the plurality of identifiers includes a plurality of names.

6. The server of claim 1, wherein the one or more parameters further include an indicator defining a respective size of each of the multiple transaction parts and wherein the iterative prompts each indicate a size of an associated one of the multiple transaction parts as determined from the indicator defining the respective size.

7. The server of claim 6, wherein the indicator defining the respective size indicates that the transaction parts are to be equal parts.

8. The server of claim 6, wherein the indicator defining the respective size associates each item that is related to the transaction with a respective one of the transaction parts.

9. The server of claim 8, wherein the indicator defining the respective size associates each item that is related to the transaction with a respective one of the transaction parts using an associated name.

10. The server of claim 1, wherein the iterative prompts prompt for completion of the transaction part using a respective physical token.

11. A method comprising:
causing a point-of-sale terminal processing a transaction to display a machine-readable code, the machine-readable code encoding a web address;
receiving a request from a device that scanned the machine-readable code, the request received at the web address;
in response to receiving the request, causing the device that scanned the machine-readable code to output an interface;
receiving, through the interface, an input of an indication to separate the transaction into multiple transaction parts and one or more parameters indicating how the transaction is to be separated, the one or more parameters including an indication of a total number of the multiple transaction parts, the one or more parameters further including a plurality of identifiers, each identifier being associated with a respective one of the transaction parts; and
sending, to the point-of-sale terminal, a message that configures the point-of-sale terminal to separate the transaction in accordance with the one or more parameters and to output, on the point-of-sale terminal, iterative prompts for input of a physical token associated with respective transaction parts using the plurality of identifiers.

12. The method of claim 11, wherein the machine-readable code encodes a base amount of a transaction and wherein the request from the device references the base amount of the transaction and the interface indicates the base amount of the transaction.

13. The method of claim 11, wherein the machine-readable code encodes a transaction identifier and wherein the request from the device references the transaction identifier, and wherein the message is sent to the point-of-sale terminal based on the transaction identifier.

14. The method of claim 11, wherein the one or more parameters include an image captured at the device that scanned the machine-readable code, the image purporting to be of a plurality of individuals, each individual associated with a respective transaction part of the multiple transaction parts, and
wherein the method further includes determining a number of the plurality of individuals from the image and the message indicates the number of the plurality of individuals.

15. The method of claim 11, wherein the plurality of identifiers includes a plurality of names.

16. The method of claim 11, wherein the one or more parameters further include an indicator defining a respective size of each of the multiple transaction parts and wherein the iterative prompts each indicate a size of an associated one of the multiple transaction parts as determined from the indicator defining the respective size.

17. The method of claim 16, wherein the indicator defining the respective size indicates that the transaction parts are to be equal parts.

18. The method of claim 16, wherein the indicator defining the respective size associates each item that is related to the transaction with a respective one of the transaction parts.

19. The method of claim 18, wherein the indicator defining the respective size associates each item that is related to the transaction with a respective one of the transaction parts using an associated name.

20. The method of claim 11, wherein the iterative prompts prompt for completion of the transaction part using a respective physical token.

* * * * *